US012714616B2

(12) United States Patent
Fletcher et al.

(10) Patent No.: US 12,714,616 B2
(45) Date of Patent: Aug. 25, 2026

(54) SYSTEM AND METHOD FOR MOVING, TURNING, AND POSITIONING A PATIENT

(71) Applicant: Sage Products, LLC, Cary, IL (US)

(72) Inventors: Hester C. Fletcher, Louisa, VA (US); Daniel Robert Ulreich, Cary, IL (US); Curtis L. Hollabaugh, Huntley, IL (US); Paul M. Fowler, Rockford, IL (US); Gregory T. Davis, Woodstock, IL (US)

(73) Assignee: SAGE PRODUCTS, LLC, Cary, IL (US)

(*) Notice: Subject to any disclaimer, the term of this patent is extended or adjusted under 35 U.S.C. 154(b) by 23 days.

(21) Appl. No.: 19/022,778

(22) Filed: Jan. 15, 2025

(65) Prior Publication Data

US 2025/0152439 A1 May 15, 2025

Related U.S. Application Data

(63) Continuation of application No. 18/197,850, filed on May 16, 2023, now Pat. No. 12,295,896, which is a (Continued)

(51) Int. Cl.
*A61G 7/00* (2006.01)
*A61G 7/10* (2006.01)

(52) U.S. Cl.
CPC ........... *A61G 7/001* (2013.01); *A61G 7/1023* (2013.01); *A61G 7/1026* (2013.01); *A61G 7/1057* (2013.01)

(58) Field of Classification Search
CPC ........ A61G 7/00; A61G 7/001; A61G 7/1023; A61G 7/1026; A61G 7/1057
See application file for complete search history.

(56) References Cited

U.S. PATENT DOCUMENTS 3,986,505 A 10/1976 Power
4,124,908 A 11/1978 Burns et al.
(Continued)

FOREIGN PATENT DOCUMENTS

EP 2 719 365 A1 4/2016
WO WO-2004/050002 A1 6/2004
WO WO-2012/170934 A2 12/2012

OTHER PUBLICATIONS

International Search Report and Written Opinion for International App. No. PCT/US2016/064241, mailed Mar. 6, 2017, 11 pages.

*Primary Examiner* — Fredrick C Conley
(74) *Attorney, Agent, or Firm* — Foley & Lardner LLP

(57) ABSTRACT

An apparatus includes a sheet, a first flap, a second flap, and a first bundling assembly. The sheet includes a first portion and a second portion. The second portion is connected to the first portion along a connection edge. The connection edge extends along a first axis. The first flap is coupled to the first portion. The second flap is coupled to the second portion. The first bundling assembly includes a first cover. The first cover is coupled to the first portion and extends along a second axis that is perpendicular to the first axis. The first cover includes a first cover first open end and a first cover second open end. The first bundling strap includes a first cover first strap portion, a first cover second strap portion, and a first cover third strap portion. The first cover first strap portion extends from the first cover first open end.

20 Claims, 27 Drawing Sheets

Related U.S. Application Data continuation of application No. 17/838,943, filed on Jun. 13, 2022, now Pat. No. 11,654,063, which is a continuation of application No. 17/137,011, filed on Dec. 29, 2020, now Pat. No. 11,357,681, which is a continuation of application No. 16/818,710, filed on Mar. 13, 2020, now Pat. No. 10,905,608, which is a continuation of application No. 15/365,632, filed on Nov. 30, 2016, now Pat. No. 10,588,800.

(60) Provisional application No. 62/352,307, filed on Jun. 20, 2016, provisional application No. 62/261,650, filed on Dec. 1, 2015.

(56) References Cited

U.S. PATENT DOCUMENTS

| | | | | |
|---|---|---|---|---|
| 4,655,207 | A | 4/1987 | Ellis | |
| 4,675,925 | A | 6/1987 | Littleton | |
| 4,895,171 | A | 1/1990 | Onik | |
| 5,044,031 | A | 9/1991 | Sherwood et al. | |
| 5,274,862 | A | 1/1994 | Palmer et al. | |
| 5,544,371 | A * | 8/1996 | Fuller | A61G 7/1015 5/85.1 |
| 5,699,568 | A | 12/1997 | Couldrigge | |
| 5,920,929 | A | 7/1999 | Hensley et al. | |
| 6,374,435 | B1 * | 4/2002 | Leininger | A61G 7/1032 5/81.1 HS |
| 9,173,789 | B2 | 11/2015 | Haskell et al. | |
| 2002/0029417 | A1 | 3/2002 | Walker | |
| 2004/0088794 | A1 | 5/2004 | Calkin | |
| 2004/0237199 | A1 | 12/2004 | Hirst | |
| 2005/0055769 | A1 * | 3/2005 | Taylor | A61G 7/1023 5/81.1 T |
| 2009/0144876 | A1 | 6/2009 | Pena et al. | |
| 2011/0296609 | A1 | 12/2011 | Giap | |
| 2013/0276227 | A1 | 10/2013 | Kenalty et al. | |
| 2014/0068858 | A1 | 3/2014 | Wambeke | |
| 2014/0317846 | A1 | 10/2014 | Collins | |
| 2015/0047120 | A1 | 2/2015 | Partridge et al. | |
| 2015/0059767 | A1 * | 3/2015 | Masucci | A61G 7/1023 128/849 |
| 2017/0056268 | A1 * | 3/2017 | Bullock | A61G 7/1055 |
| 2017/0216117 | A1 | 8/2017 | Rigoni et al. | |

* cited by examiner

SYSTEM AND METHOD FOR MOVING, TURNING, AND POSITIONING A PATIENT

CROSS-REFERENCE TO RELATED PATENT APPLICATIONS

This application is a continuation of U.S. patent application Ser. No. 18/197,850, filed May 16, 2023, which is a continuation of U.S. patent application Ser. No. 17/838,943, filed Jun. 13, 2022, which is a continuation of U.S. patent application Ser. No. 17/137,011, filed Dec. 29, 2020, which is a continuation of U.S. patent application Ser. No. 16/818,710, filed Mar. 13, 2020, which is a continuation of U.S. patent application Ser. No. 15/365,632, filed Nov. 30, 2016; which claims the benefit of and priority to U.S. Provisional Patent Application No. 62/261,650, filed Dec. 1, 2015, and U.S. Provisional Patent Application 62/352,307, filed Jun. 20, 2016; all of which are hereby incorporated by reference herein in their entireties.

BACKGROUND

The present application generally relates to an apparatus, system, and method for moving, turning, and positioning a person on a bed or the like, and, more particularly, to a patient support device for use in rolling a patient between a supine position and a prone position, utilizing a cross-wrapping configuration, as well as systems and methods including one or more of such devices.

Nurses and other caregivers at hospitals, assisted living facilities, and other locations often need to move a patient with limited or no independent mobility between a supine (lying face up) position and a prone (lying face down) position. An example of a patient requiring such movement is a one who is to undergo spinal or other surgery where an incision is to be made on the patient's posterior side. For such procedures, the patient must be placed prone on an operating table. Many such patients are partially or completely sedated before being rolled from the supine to the prone position. Rolling a sedated patient in this manner may require caregivers to lift the patient and/or bend and reach over the patient, all movements that place increased stress on the caregivers and increase the risk of injury to those caregivers. Additionally, care must be taken not to place excessive stress on the patient during rolling and to avoid causing injury to the patient's back or extremities during the maneuver.

The present disclosure seeks to overcome certain of these limitations and other drawbacks of existing devices, systems, and methods, and to provide new features not heretofore available.

SUMMARY

In one embodiment, an apparatus includes a sheet having a top surface, a bottom surface, a first lateral side, and a second lateral side, a first flap coupled to the bottom surface proximate the first lateral side, a second flap coupled to the bottom surface proximate the second lateral side and longitudinally offset from the first flap, a first strap coupled to the first flap, and a second strap coupled to the second flap.

In another embodiment, an apparatus includes a sheet having a top surface, a bottom surface, a first lateral side and a second lateral side, wherein the sheet includes a first portion and a second portion, wherein each portion is defined by a plurality of peripheral edges including two end edges, a side edge, and a connection edge, opposite the side edge, at which the first portion and the second portion are coupled, a first strap coupled to the bottom surface of the sheet proximate the first lateral side, and a second strap coupled to the bottom surface of the sheet proximate the second lateral side and longitudinally offset from the first strap.

In another embodiment, an apparatus includes a sheet having a top surface, a bottom surface, a first lateral side and a second lateral side wherein the sheet includes a first portion and a second portion, wherein each portion is defined by a plurality of peripheral edges including two end edges, a side edge, and a connection edge, opposite the side edge, at which the first portion and the second portion are releasably coupled, a first strap coupled to the bottom surface of the first portion of the sheet proximate the first lateral side, a second strap coupled to the bottom surface of the first portion of the sheet proximate the connection edge, a third strap coupled to the bottom surface of the second portion of the sheet proximate the second lateral side, and a fourth strap coupled to the bottom surface of the second portion of the sheet proximate the connection edge.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE FIGURES

To understand the present invention, it will now be described by way of example, with reference to the accompanying drawings in which.

DETAILED DESCRIPTION

Figure 1:
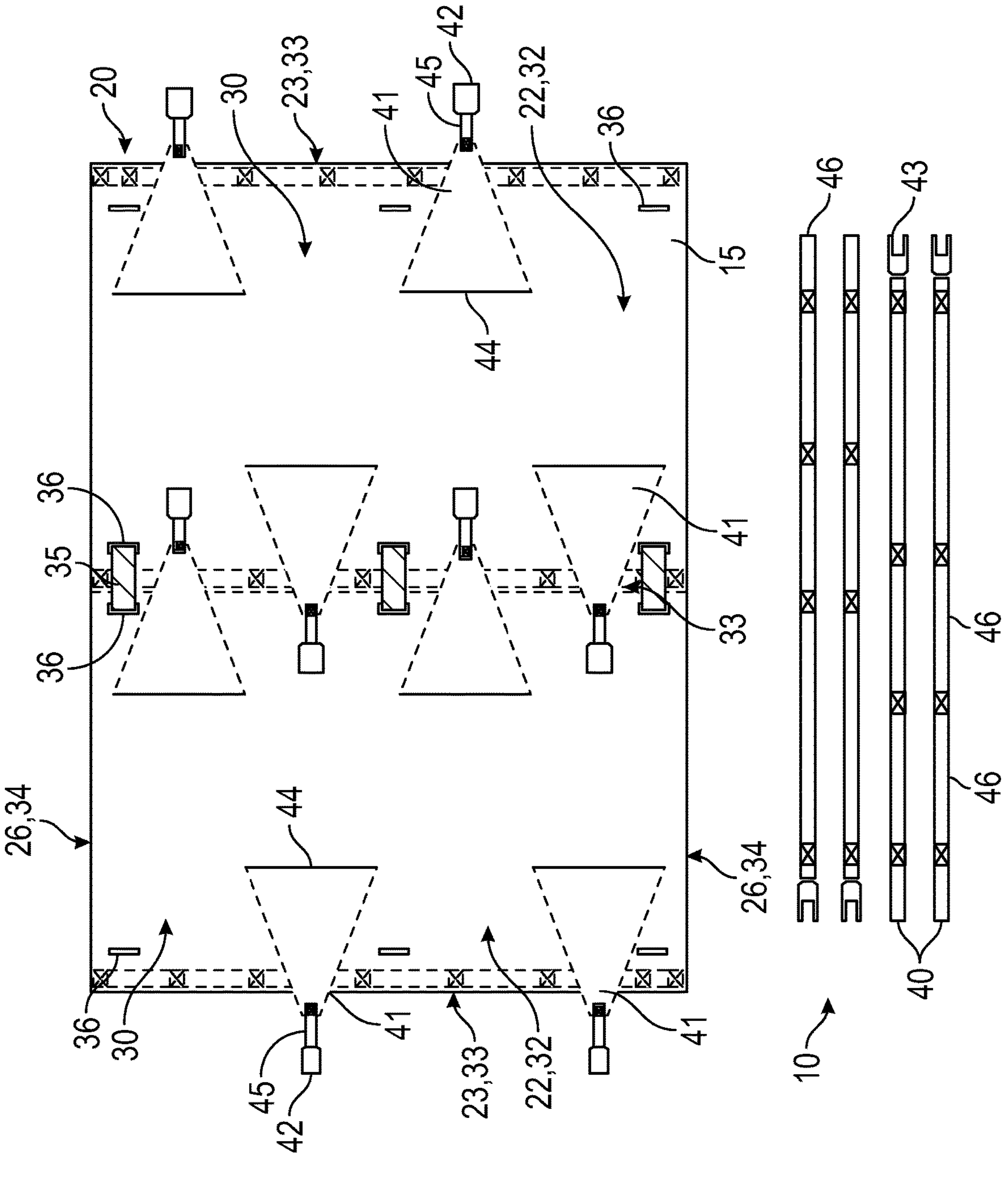
FIG. 1 is a bottom view of one embodiment of a patient turning system according to aspects of the present disclosure.
Figure 2:
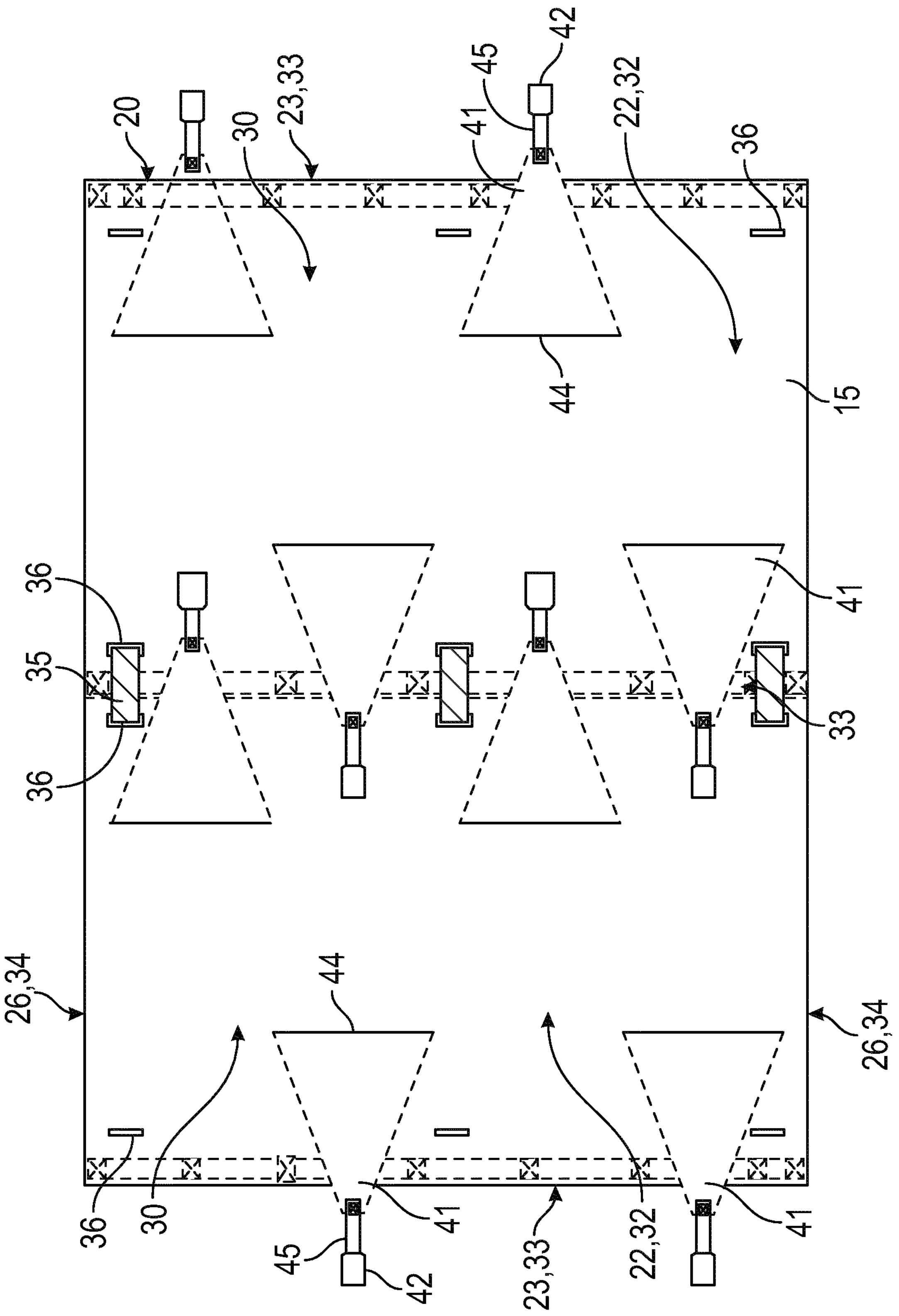
FIG. 2 is a bottom view of a patient turning device of the system of FIG. 1.
Figure 3:
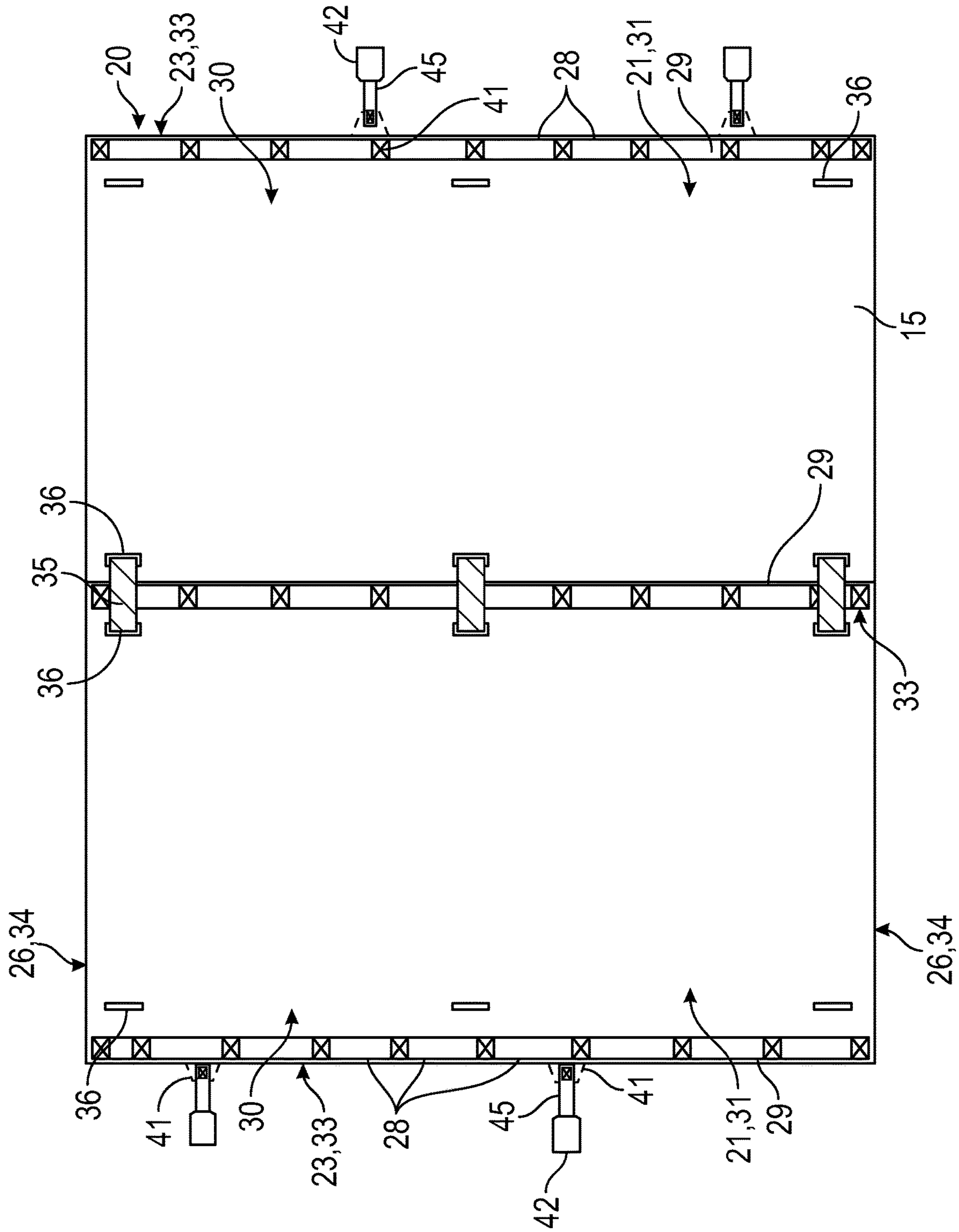
FIG. 3 is a top view of the device of FIG. 2.
Figure 4:
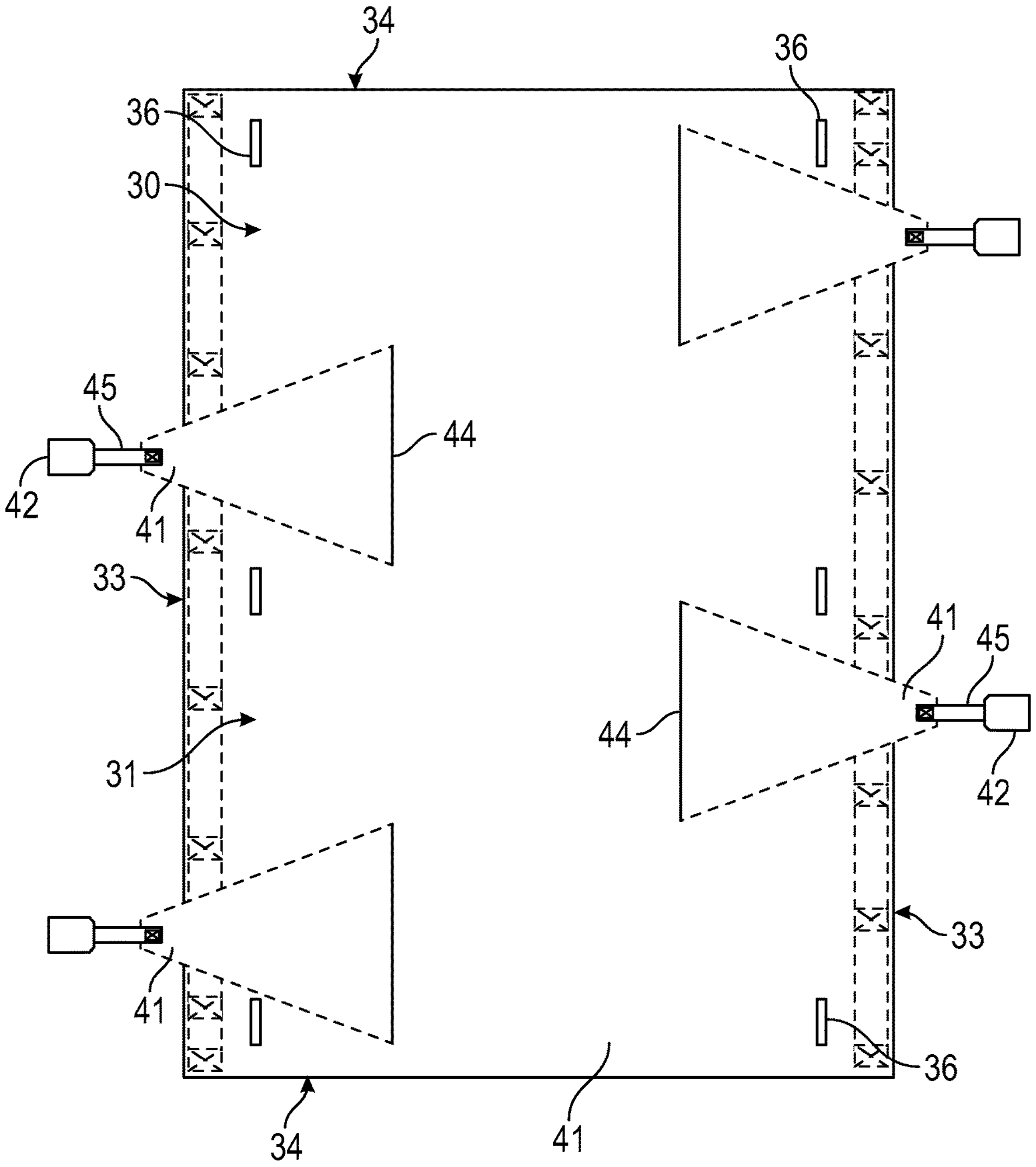
FIG. 4 is a bottom view of a sheet portion of the device of FIG. 2.
Figure 5:
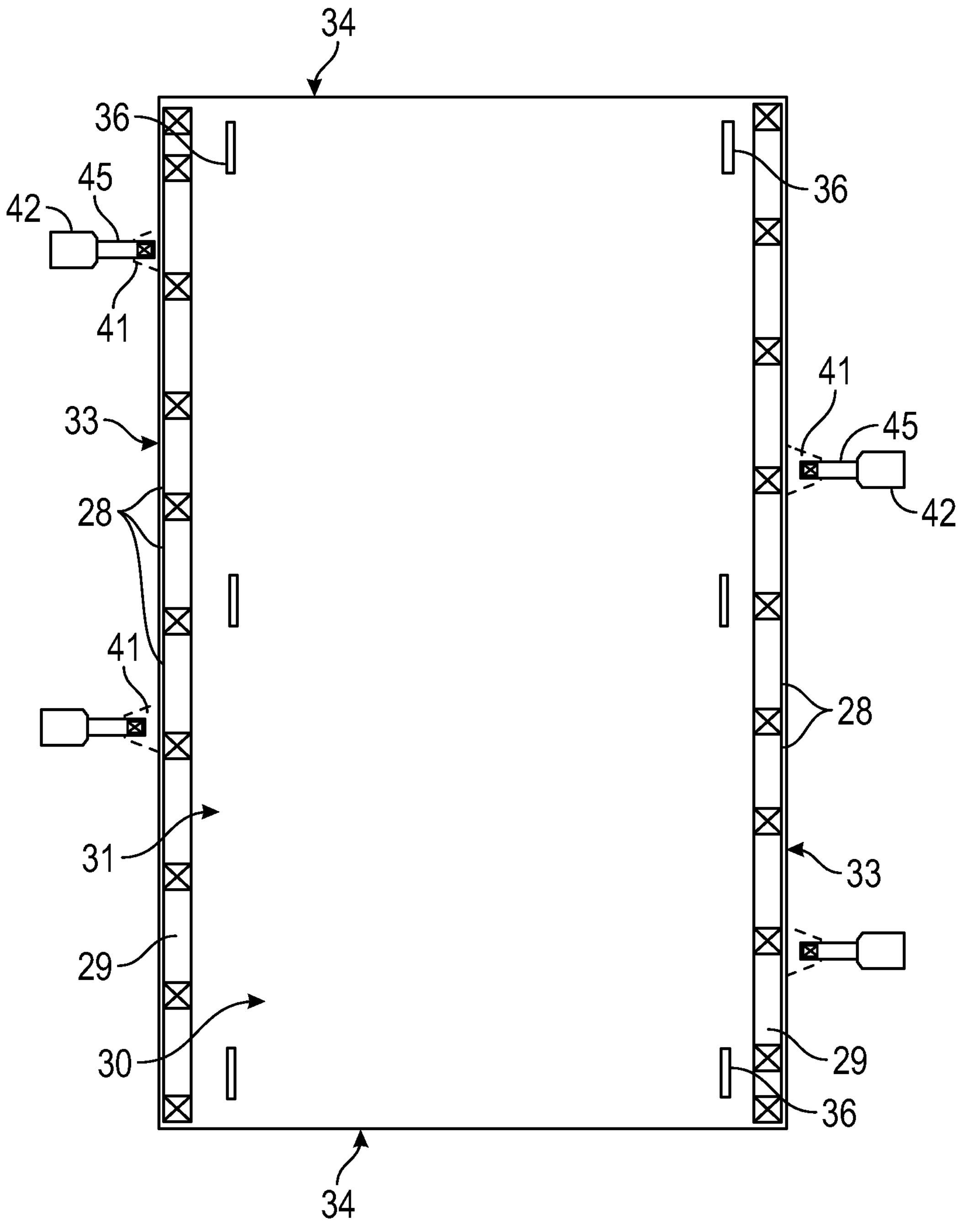
FIG. 5 is a top view of the sheet portion of FIG. 4.

While this invention is capable of embodiment in many different forms, there are shown in the drawings, and will herein be described in detail, certain embodiments of the disclosure with the understanding that the present disclosure is to be considered as an example of the principles of the disclosure and is not intended to limit the broad aspects of the disclosure to the embodiments illustrated and described.

In general, aspects of the disclosure relate to a device for turning a patient, including a sheet with a plurality of handles or straps configured for rolling a patient, as well as systems including one or more of such devices and methods utilizing one or more of such systems and/or devices. Various embodiments of the disclosure are described below.

Referring now to the figures, and initially to FIGS. 1-6, there is shown an example embodiment of a system 10 for use in turning and positioning a person resting on a surface, such as a patient lying on a hospital bed, which includes a patient turning device 20. As shown in FIGS. 17-20, the system 10 is configured to be placed on a support device 12 supporting a patient. One example of such a support device 12 is a hospital bed 12A, as illustrated in FIGS. 17-20. Such a support device 12 generally includes a frame and a supporting surface 16 supported by the frame, and has a head 13, a foot 17 opposite the head 13, and opposed sides or edges 19 extending between the head 13 and the foot 17. The supporting surface 16 can be provided by a mattress or similar structure. A hospital bed 12A or other support device 12 may also include one or more bed sheets (such as a fitted sheet or flat sheet), as well as pillows, blankets, additional sheets, and other components known in the art. Another example of such a support device 12 is an operating table 12B, as also shown in FIGS. 17-20, which may be configured for supporting a person in a prone position or another position. Such an operating table 12B may also have a supporting surface 16 with structures configured for securely supporting a person in a specific position for surgery. The operating table 12B in FIGS. 17-20 is configured for use in spinal surgery, and is configured to support a patient 11 in a prone position for extended periods of time. It is understood that the system 10 and the components thereof can be used with other types of beds, tables, and other support devices as well, such as a gurney, a stretcher, a cot, a different type of bed (other than a hospital bed), a different type of operating table, etc.

FIGS. 1-6 illustrate an example embodiment of the device 20, which is in the form of a sheet 15 having a top surface 21 and a bottom surface 22 defined by a plurality of peripheral edges including two side edges 23 and two end edges 26. The sheet 15 in the embodiment of FIGS. 1-6 is formed by two sheet portions or sheet members 30 that are removably connected to each other to form the sheet 15, although in another embodiment, the sheet 15 may be a single-piece structure or may be formed by more than two sheet portions 30. It is understood that the sheet 15 and/or the sheet portions 30 may not be a single-layer structure, and may have multiple layers. It is also understood that when components are described herein as being connected to and/or interacting with the device 20, such components can be considered to be connected to and/or interacting with the sheet 15 forming the body of the device 20. The device 20 is configured to be positioned on the support device 12 so that the bottom surface 22 (or a portion thereof) is above the supporting surface 16 of the support device 12 and faces or confronts the supporting surface 16, and is supported by the supporting surface 16. As used herein, “above,” “below,” “over,” and “under” do not imply direct contact or engagement. For example, the bottom surface 22 being above the supporting surface 16 means that that the bottom surface 22 may be in contact with the supporting surface 16, or may face or confront the supporting surface 16 and/or be supported by the supporting surface 16 with one or more structures located between the bottom surface 22 and the supporting surface 16, such as a bed sheet as described above. Likewise, “facing” or “confronting” does not imply direct contact or engagement, and may include one or more structures located between the surface and the structure it is confronting or facing. The sheet 15 in the embodiment of FIGS. 1-6 has rotational symmetry, such that the sheet 15 will appear substantially identical if rotated 180° in either direction in the general plane of the sheet 15. In this symmetrical configuration, either of the end edges 26 may be positioned at the head 13 or the foot 17 of the support device 12. In another embodiment, the sheet 15 may lack this symmetry, and may have dedicated head and foot edges 26, as shown in FIGS. 11-16 and described in greater detail below.

In one embodiment, the sheet 15 of the device 20 may be made from multiple, separate sheet portions 30 that are removably connected together to form the sheet 15. The device 20 illustrated in FIGS. 1-6 is formed from two identical or substantially identical sheet portions 30 that are connected together by releasable connectors 35. Each sheet portion 30 has a top surface 31 and a bottom surface 32 defined by a plurality of peripheral edges, including two side edges 33 and two end edges 34. Each sheet portion 30 in the embodiment of FIGS. 1-6 has rotational symmetry as described above, such that either of the end edges 34 may be positioned at the head 13 or the foot 17 of the support device 12. The sheet portions 30 may lack this symmetry in another embodiment, as shown in FIGS. 11-16 and 21-27, and described in greater detail below. In the symmetrical configuration, the sheet portions 30 may also be connectable to each other in any orientation. For example, the sheet portions 30 in the embodiment of FIGS. 1-6 can be connected together side-by-side along either side edge 33 of either sheet portion 30. The side edges 33 of the sheet portions 30 that are connected together may be referred to as “connection edges,” and in the embodiment of FIGS. 1-6, the connection side edge 33 of each sheet portion is opposite the side edge 33 that defines a side edge 23 of the sheet 15. The connection side edges 33 in this embodiment are removably connected to each other such that the sheet portions 30 combine to form the sheet 15. The connection of the sheet portions 30 is described in greater detail below.

The sheet portions 30 may generally be configured for removable connection to each other in one embodiment, as described above. Each sheet portion 30 in the embodiment of FIGS. 1-6 is configured for connection by releasable connectors 35 in the form of releasable loop straps that extend through apertures 36 (e.g., holes) proximate to the side edges 33 in the sheet portions 30. In the embodiment of FIGS. 1-6, each sheet portion 30 has three apertures 36 positioned along each side edge 33 that are spaced slightly inwardly and spaced substantially equal distances from each other along the side edge 33. The apertures 36 may be reinforced, such as by a button stitch or other reinforcing structure. Additionally, the apertures 36 in this embodiment are symmetrical with respect to the end edges 34, with one aperture 36 located midway between the end edges 34 and the other apertures 36 spaced equal distances from the center aperture 36. Further, the apertures 36 along one side edge 33 are laterally aligned with the apertures 36 on the other side edge 33 in this embodiment. This symmetry permits the sheet portion 30 to be connected along either side edge 33 to either side edge 33 of another substantially identical sheet portion 30, and the apertures 36 will align to permit such a connection. The loop straps in the embodiment of FIGS. 1-6 are provided with hook-and-loop connections or other complementary releasable connecting materials to permit the releasable connection, but connectors 35 in other embodiments may include another releasable connection structure, such as buttons, snaps, clasps, or other fasteners, magnets, ties, buckles, tacky or semi-adhesive surfaces, etc. FIGS. 1-3 and 6 illustrate two sheet portions 30 connected side-by-side using loop strap connectors 35, and in these embodiments, a portion of the bottom surface 32 of one sheet portion 30 overlaps and confronts a portion of the top surface 31 of the other sheet portion 30.

The device 20 may utilize different types of connectors 35 in other embodiments. For example, in the embodiment shown in FIGS. 7-10, the sheet portions 30 are connected to each other by use of connectors 35 in the form of strips of complementary releasable connecting materials (e.g., hook-and-loop connectors). Accordingly, the sheet portions 30 in the embodiment of FIGS. 7-10 do not use apertures 36 for connection. The embodiment of FIGS. 7-10 is otherwise substantially identical to the embodiment in FIGS. 1-6, both in structure and in function, and such similar or identical structures and functions in the embodiment of FIGS. 7-10 will not otherwise be described in detail for the sake of brevity. The connectors 35 in the embodiment of FIGS. 7-10 are provided along both side edges 33 on both the top and bottom surfaces 31, 32 of the sheet portions 30. Additionally, the connectors 35 in this embodiment are positioned in a rotationally symmetrical arrangement as described above, such the connectors 35 will be substantially identically arranged if the sheet portion 30 is rotated 180° in either direction in the general plane of the sheet portion 30. This symmetry permits the sheet portion 30 in FIGS. 7-10 to be connected along either side edge 33 to either side edge 33 of another substantially identical sheet portion 30, and the connectors will align to permit such a connection. It is understood that complementary releasable connecting materials may be arranged to permit such connectivity, for example, the sheet portion 30 may have only hook-type connectors on the bottom surface 32 and only loop-type connectors on the top surface 31, so that the connectors 35 on the top surface 31 will always be connectable to connectors 35 on the bottom surface 32 of an identical sheet portion 30. In this configuration, the bottom surface 32 of one sheet portion 30 overlaps and confronts a portion of the top surface 31 of the other sheet portion 30, and the connectors 35 are positioned on these overlapping portions to form a releasable connection. The connectors 35 in FIGS. 7-10 are provided as separate pieces along the side edges 33, but may be provided as a single, continuous strip in another embodiment, such as shown in FIGS. 11-16. In other embodiments, other types of releasable connectors 35 may be used, including other types of connectors that connect directly to the sheet portions 30, such as by use of snaps, buttons, adhesives, magnets, or other structures, other connectors that extend through apertures 36 in the sheet portions 30, and additional releasable connecting structures. In a further embodiment, two or more different types of releasable connectors 35 may be used, including any combination of structures described herein.

The sheet 15 and/or the sheet portions 30 may be made from a material that permits sliding of the device 20 in contact with the supporting surface 16 of the support device 12, which may include a fitted bed sheet or other sheet. This material may have a relatively low coefficient of friction to ease in sliding the device 20 on the supporting surface 16 when the patient is on top of the device 20. The material of the sheet 15 and/or the sheet portions 30 may also have rip-stop properties, and may have suitable structural strength and stability to form the primary structural component of the device 20. In one embodiment, the sheet 15 and/or the sheet portions 30 may be formed of polyester and/or nylon (polyamide), for example, a rip-stop nylon material or a coated nylon taffeta material that is liquid repellant and/or impermeable and has little to no air permeability, while being permeable to moisture vapor. The material can also be treated with a water repellant, such as polytetrafluoroethylene (PTFE). Other suitable materials may be used for this purpose. In addition, the device 20 may have one or more portions that are covered with or formed of a high-friction material, such as a sheet material or a high-friction coating, to resist sliding of the patient against the sheet 15, in one embodiment.

The system 10 generally has a plurality of pull handles (e.g., pull straps 40) connected to the device 20 and configured for wrapping over the patient 11, such that one or more of the pull handles can be pulled to roll the patient between various positions, e.g., between a supine position and a prone position. In the embodiment shown in FIGS. 1-20, the pull handles are elongated pull straps 40. In one embodiment, the device 20 includes at least one pull strap 40 connected to the bottom surface 22 of the sheet 15 proximate one side edge 23 and at least one other pull strap 40 connected to the bottom surface 22 of the sheet 15 proximate the other side edge 23. The pull straps 40 may be connected to the sheet 15 at a location spaced laterally inwardly from the side edges 23 (i.e., away from the edges 23 and toward the centerline of the sheet 15), in order to provide a better leverage point for turning the patient 11 and to accommodate patients of various sizes. The pull straps 40 may also be configured to extend laterally outwardly from the connection points (i.e., in a direction from the center of the sheet 15 toward the respective side edge 23) and to extend outwardly beyond the side edges 23. In this configuration, a portion of the sheet 15 at one side edge 23 may be received between the pull strap 40 and the sheet 15 at the opposite side edge 23 when the device 20 is wrapped around the patient 11, such that the opposed side edges 23 of the sheet 15 overlap. In the embodiment of FIGS. 1-6, the device 20 has four pull straps 40, with one pair of pull straps 40 connected to the sheet 15 along one of the side edges 23 and another pair of pull straps 40 connected along the opposite side edge 23. Each pair of pull straps 40 in this configuration are spaced along the side edge 23, so that one of the pull straps 40 of each pair is proximate the upper body of the patient 11 and the other is proximate the lower body of the patient 11. Additionally, in this embodiment, the connection points of the pull straps 40 are staggered longitudinally (i.e., in a direction extending between the end edges 26) with respect to the pull straps 40 along the opposite side edge 23, such that when the side edges 23 are wrapped toward each other, the pull straps 40 do not directly overlap each other. A different number and/or configuration of pull straps 40 may be used in another embodiment.

Figure 6:
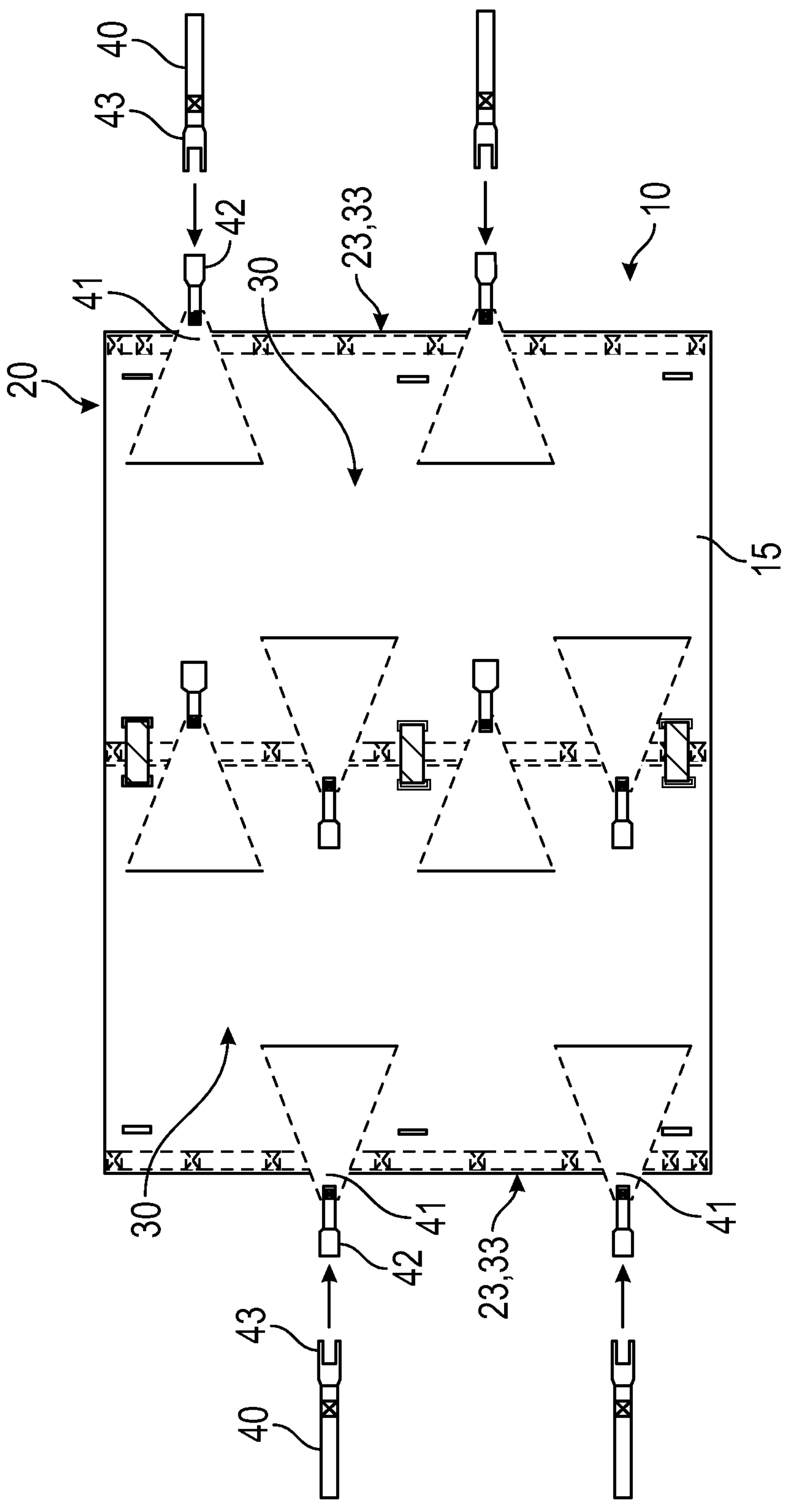
FIG. 6 is a bottom view of the system of FIG. 1, showing pull straps being connected to connectors on the patient turning device.
Figure 7:
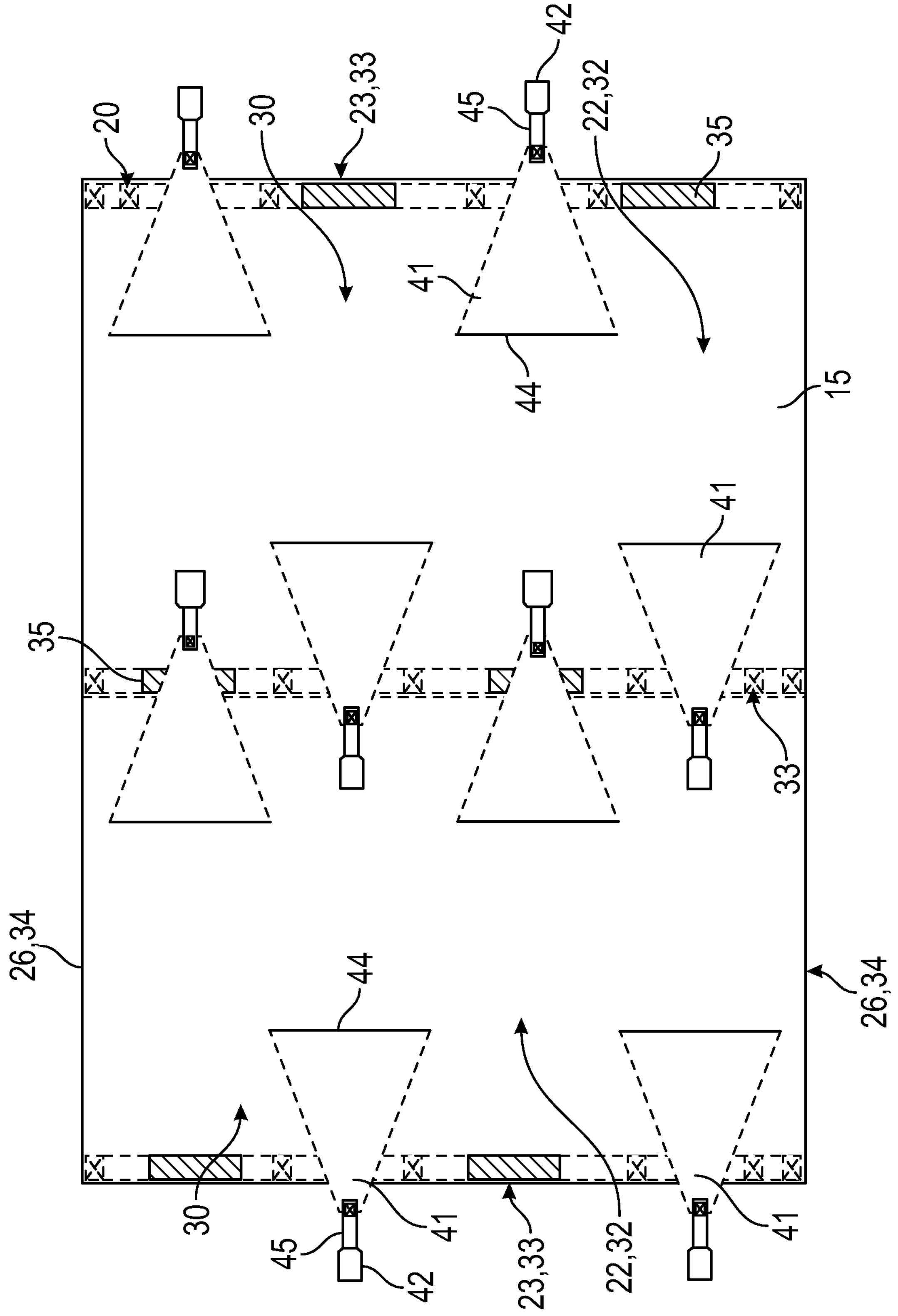
FIG. 7 is a bottom view of another embodiment of a patient turning device according to aspects of the present disclosure, configured for use with a system as shown in FIG. 1.
Figure 8:
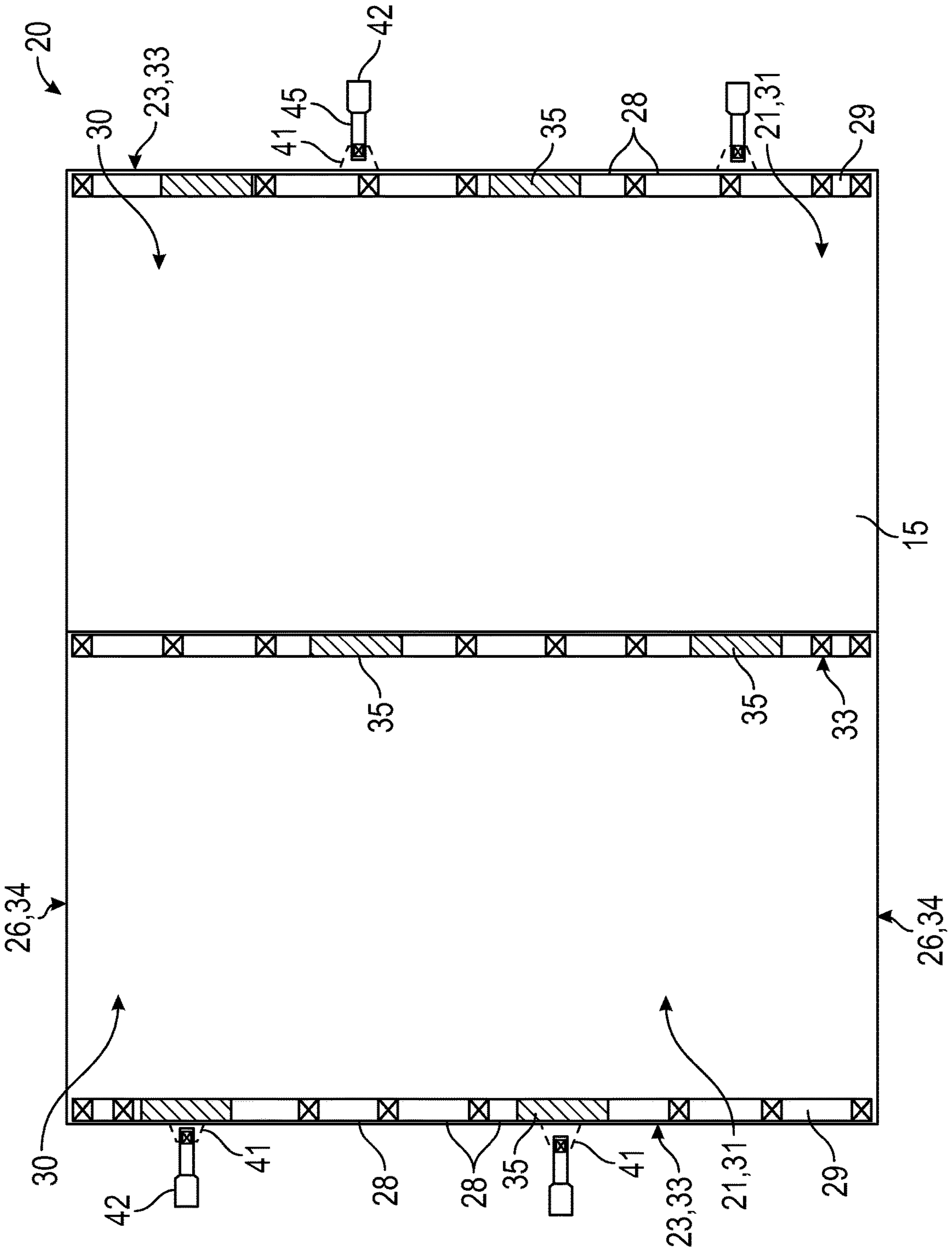
FIG. 8 is a top view of the device of FIG. 7.
Figure 9:
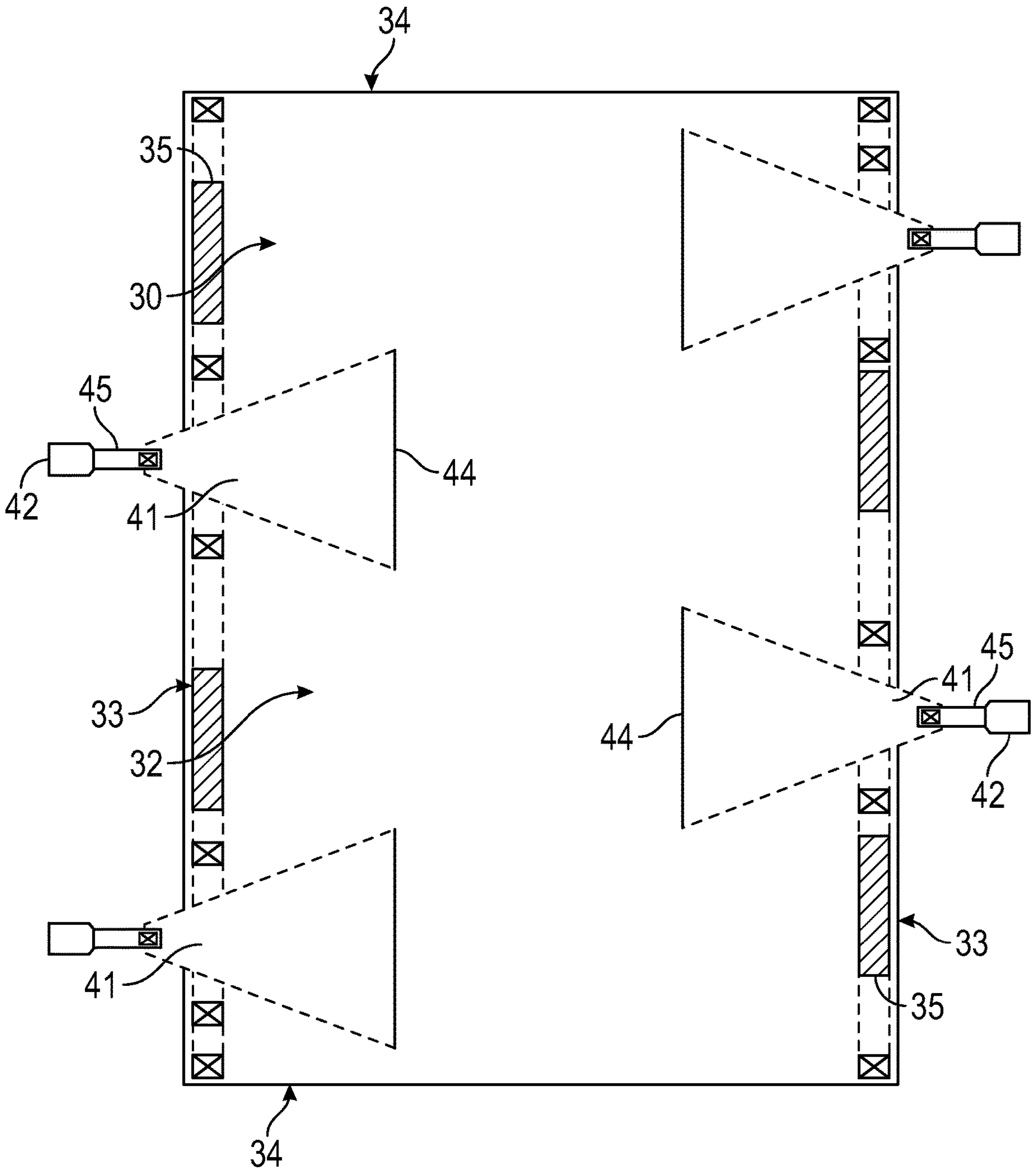
FIG. 9 is a bottom view of a sheet portion of the device of FIG. 7.
Figure 10:
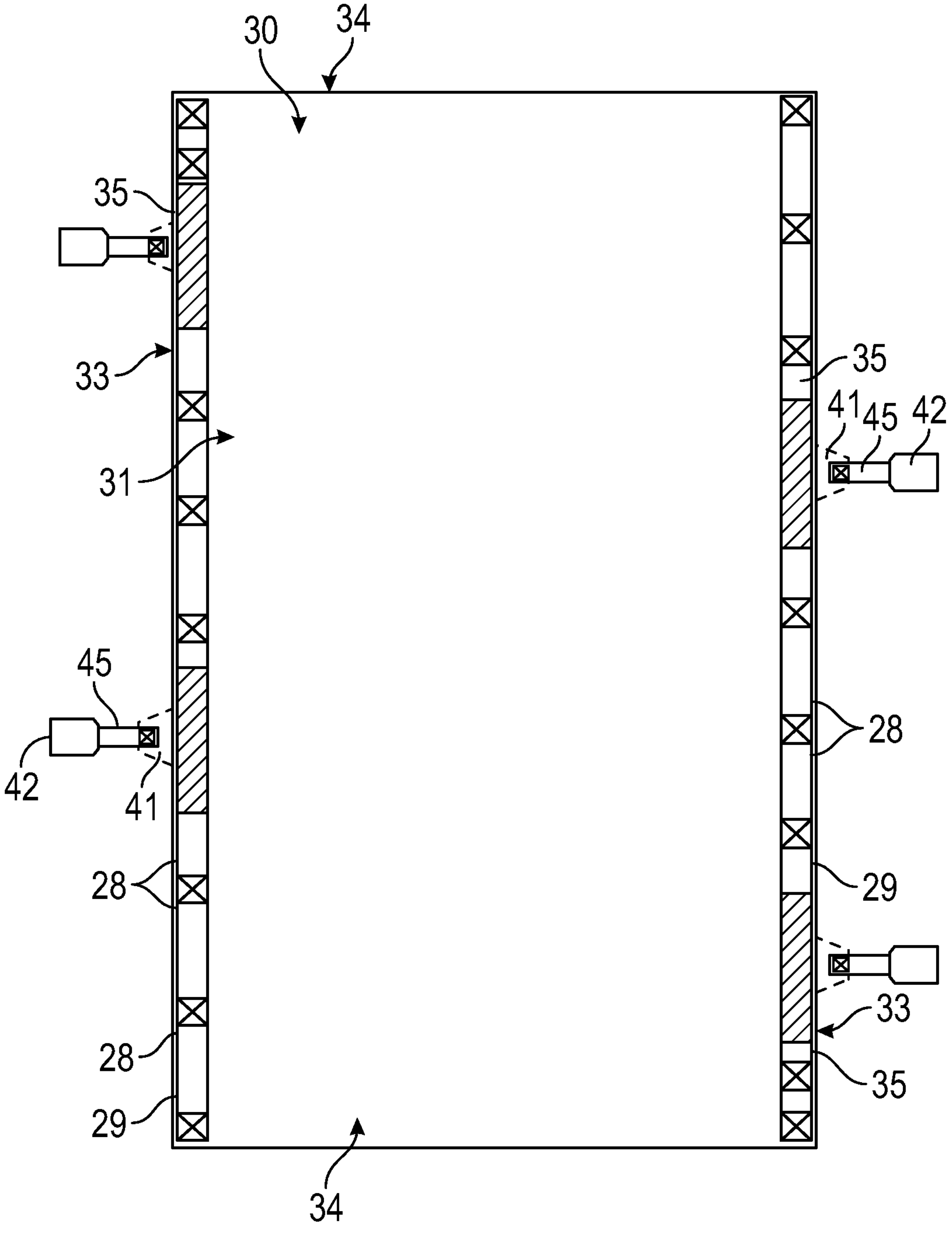
FIG. 10 is a top view of the sheet portion of FIG. 9.
Figure 11:
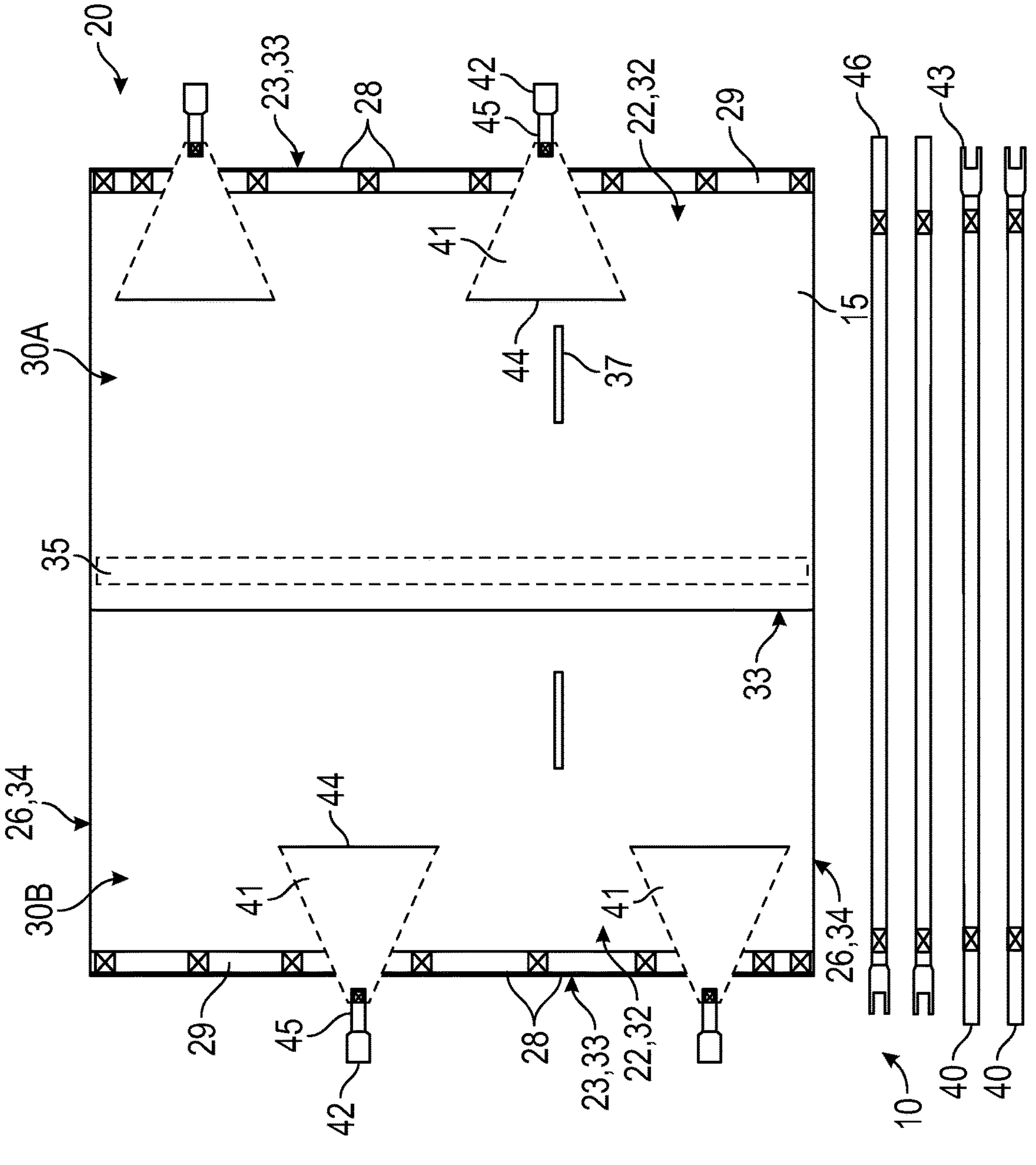
FIG. 11 is a bottom view of another embodiment of a patient turning system according to aspects of the present disclosure.
Figure 12:
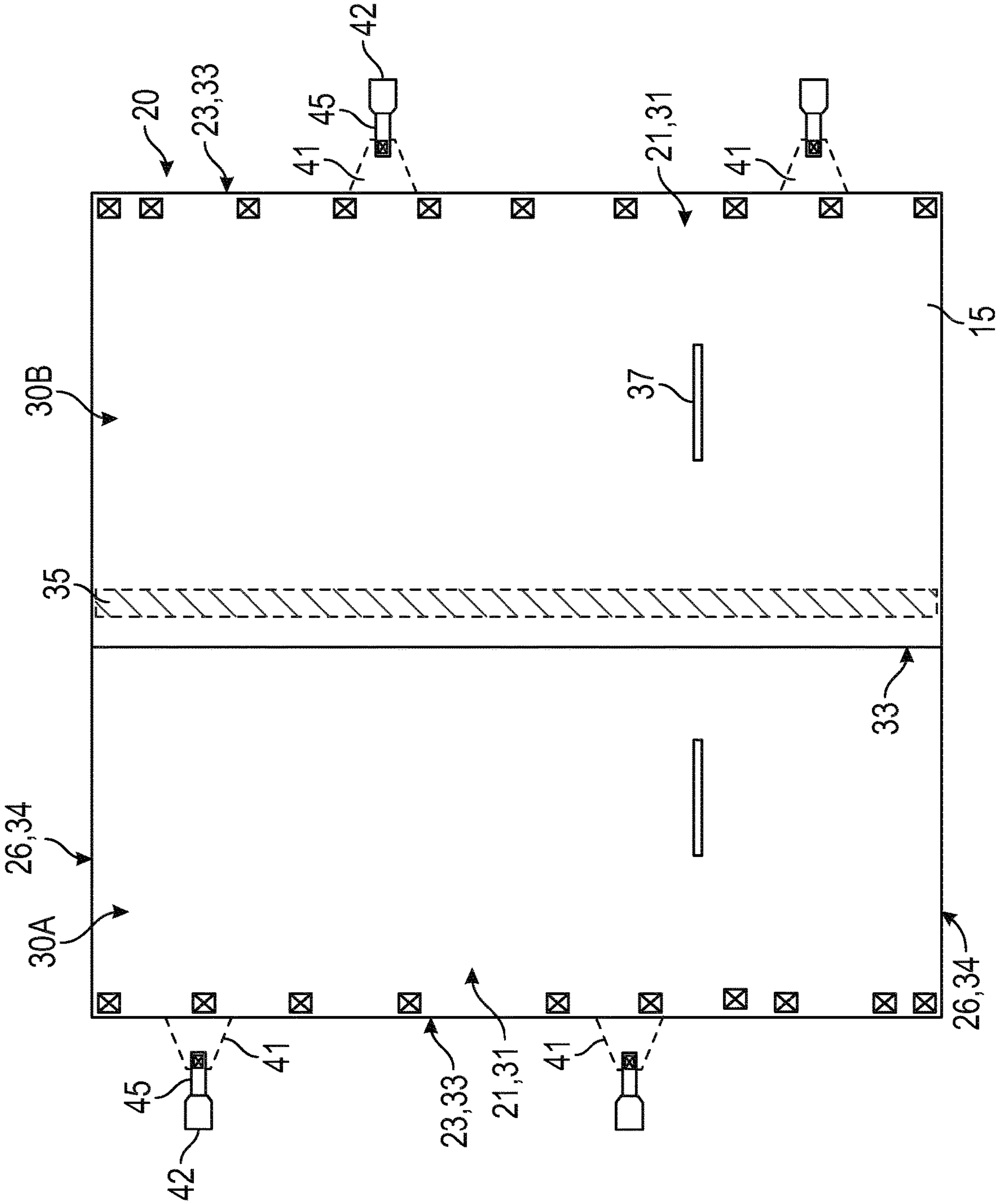
FIG. 12 is a top view of the device of FIG. 11.
Figure 13:
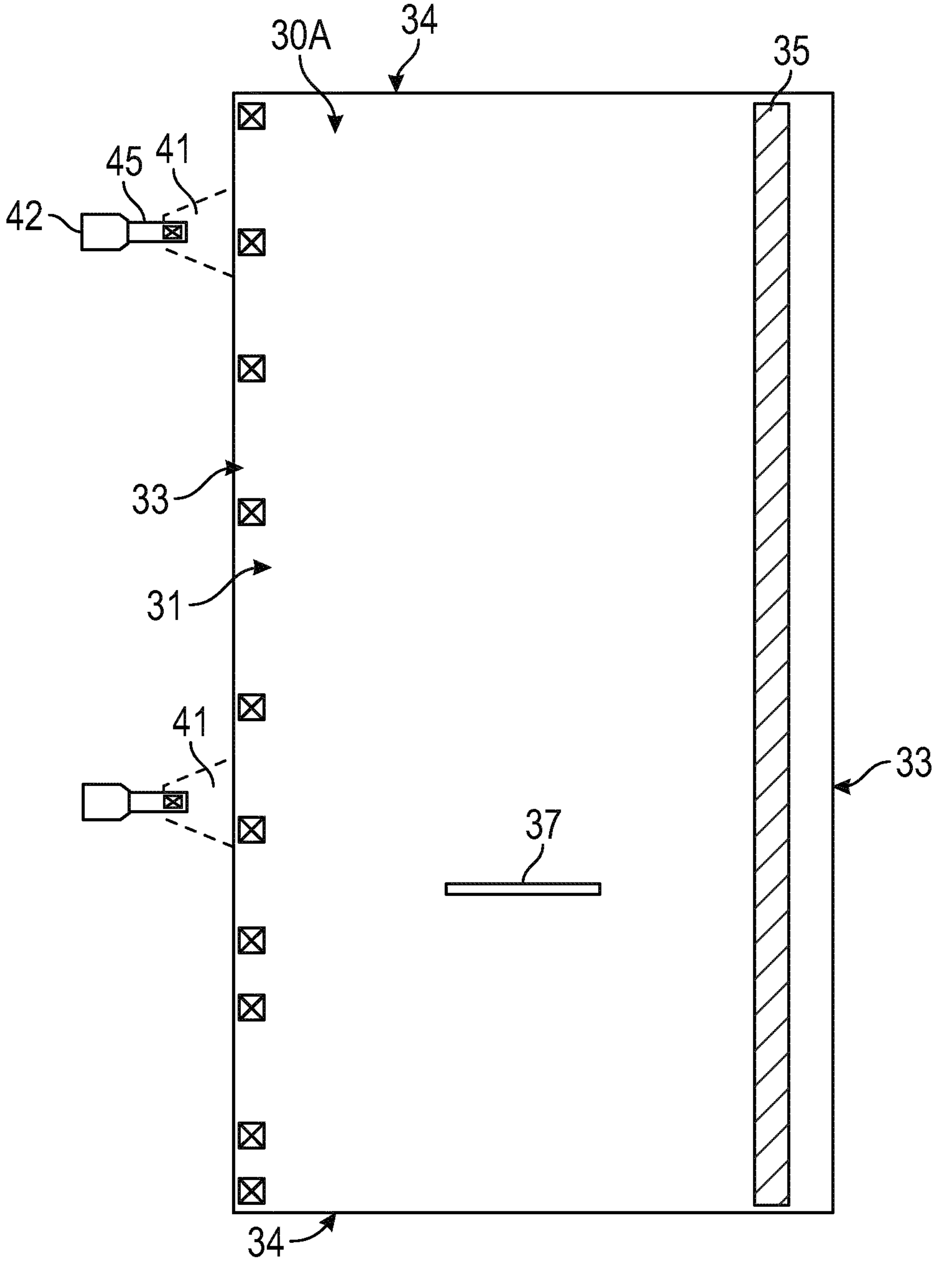
FIG. 13 is a top view of a left sheet portion of the device of FIG. 11.
Figure 14:
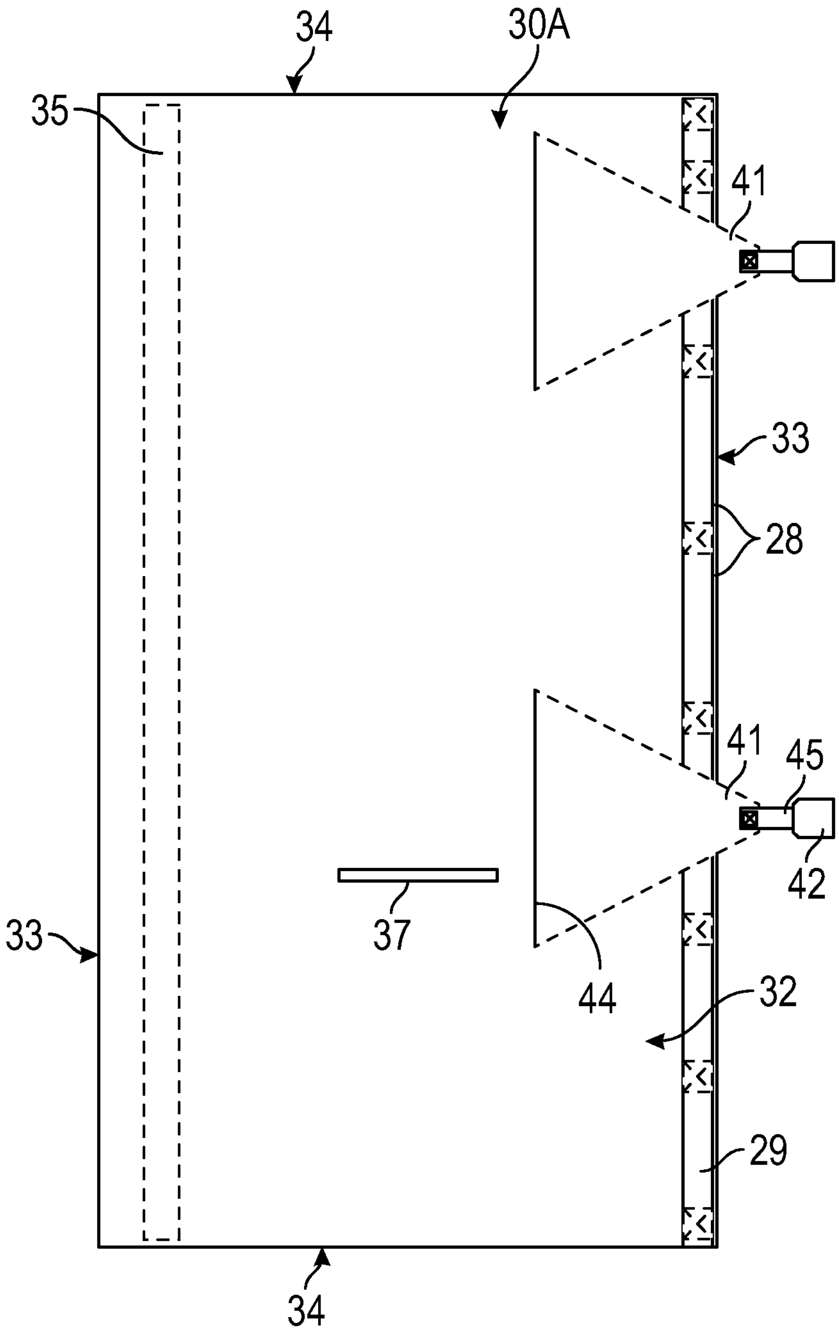
FIG. 14 is a bottom view of the left sheet portion of FIG. 13.
Figure 15:
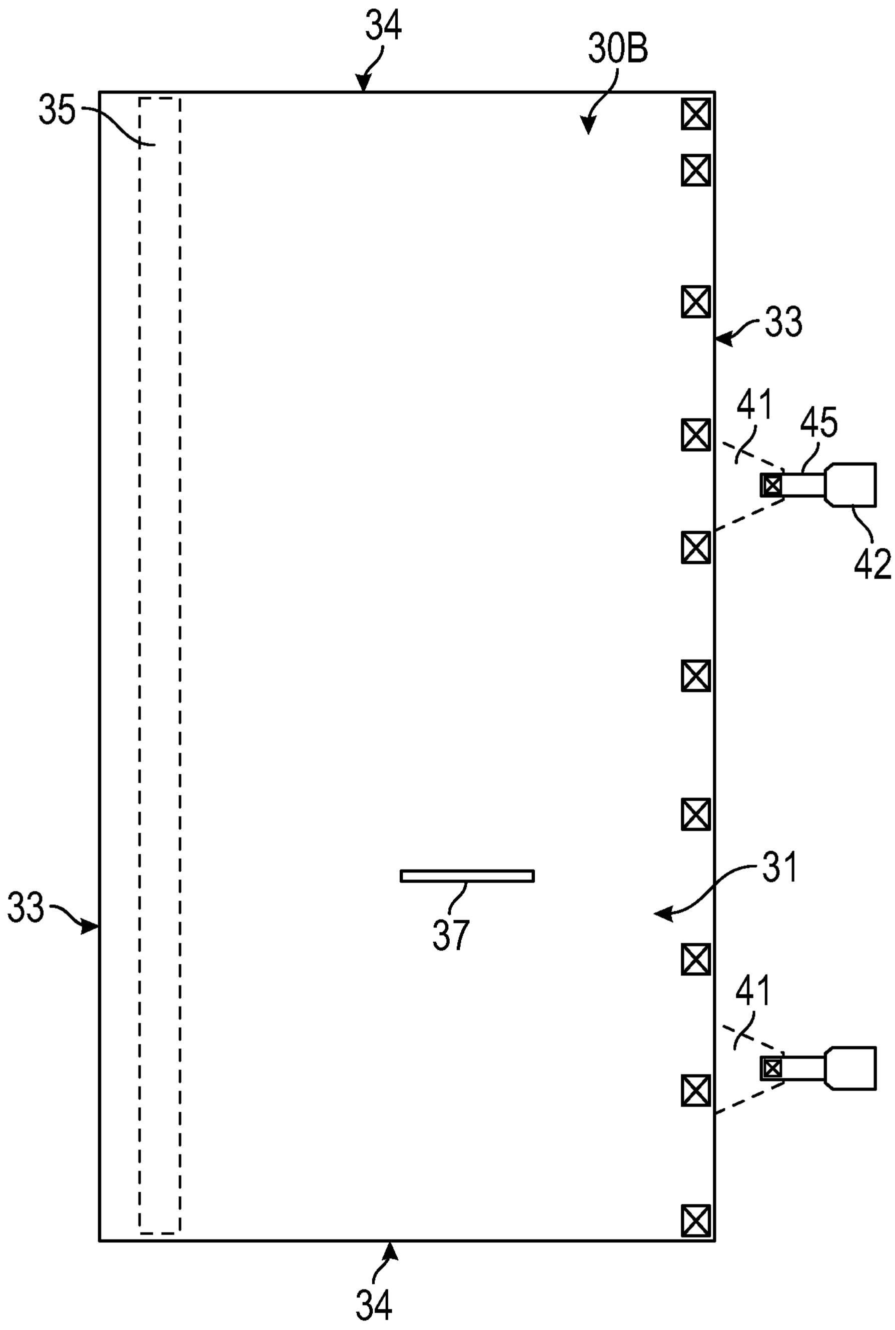
FIG. 15 is a top view of a right sheet portion of the device of FIG. 11.
Figure 16:
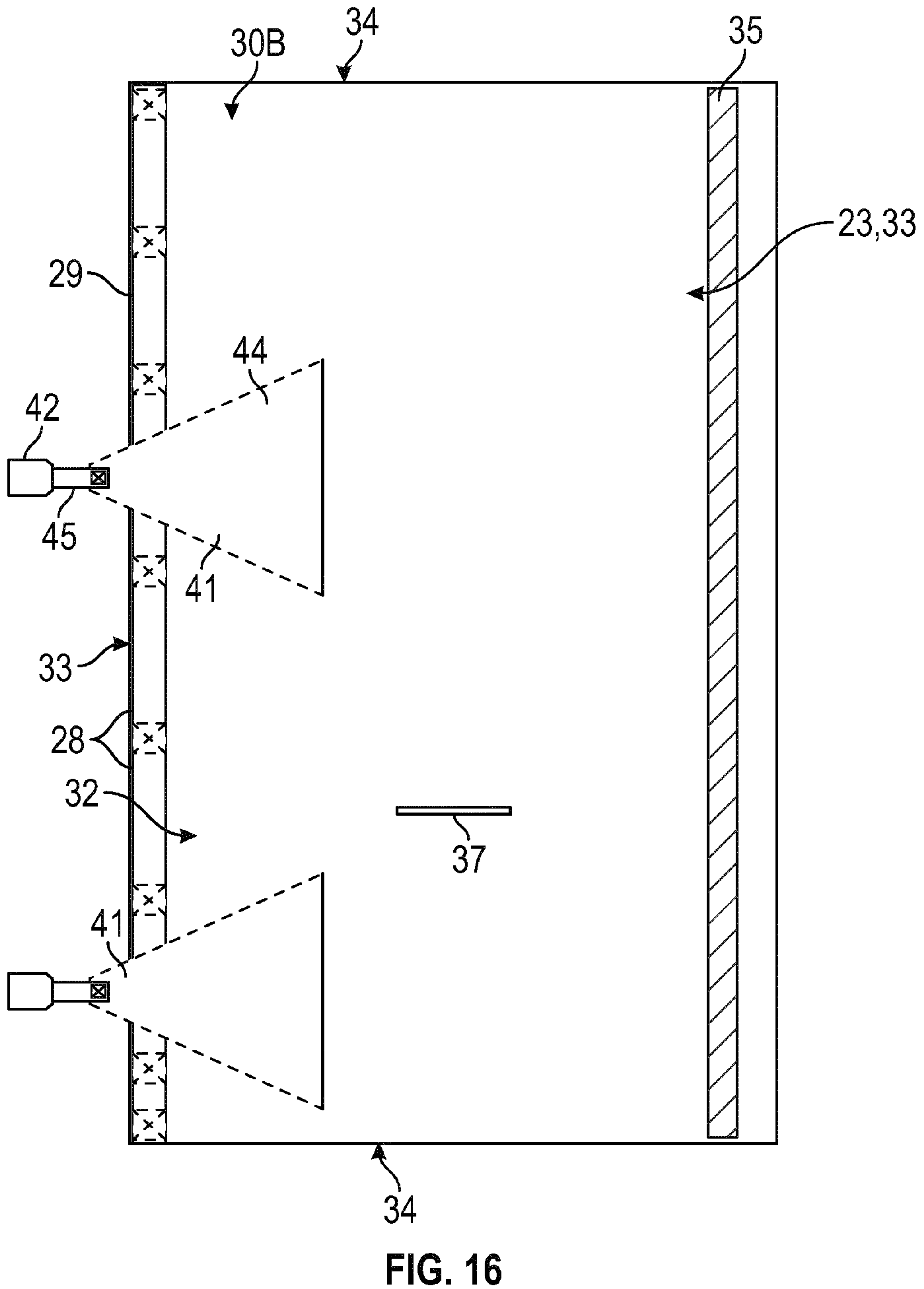
FIG. 16 is a bottom view of the right sheet portion of FIG. 15.

In one embodiment, as shown in FIGS. 1-6, the pull straps 40 are connected to the sheet 15 by the use of flaps 41 that are fixedly connected to the sheet 15 (e.g., by stitching, adhesive, etc.) and have releasable connecting structures 42 for connection to the pull straps 40. The pull straps 40 have complementary releasable connecting structures 43 that are configured for releasable connection to the connecting structures 42 of the flaps 41. As shown in FIGS. 1 and 6, the complementary connecting structures 42, 43 are in the form of a buckle, e.g., a side-release buckle, although various other types of buckles and other releasable connecting structures may be used, including any releasable connecting structures described herein. The buckles 42 as illustrated in FIGS. 1-6 are connected to the flaps 41 by extensions 45 that are fixedly connected to the flaps 41 (e.g., by stitching) and to the buckles 42. The flaps 41 in this embodiment form the connection points between the pull straps 40 and the sheet 15, and in one embodiment, the flaps 41 are fixedly connected to the sheet 15 at locations proximate the side edges 23 that are spaced laterally inwardly from the side edges 23. In the embodiment of FIGS. 1-6, the device includes two flaps 41 along each side edge 23, with each pair of flaps 41 spaced from each other along the side edge 23 and longitudinally staggered from the flaps 41 along the opposite side edge 23. The flaps 41 in this embodiment are generally triangular in shape, with a wide base 44 connected to the sheet 15 and decreasing in width farther from the base 44. This shape provides a large surface area for the connection between the flap 41 and the sheet 15, increasing the strength of the connection, while also retaining shape when both under tension and not under tension. The flaps 41 may further be made from a flexible sheet material, which may be the same material as the sheet 15 and/or the sheet portions 30. In a further embodiment, the pull straps 40 may be fixedly connected to the flaps 41 or directly to the sheet 15, or the pull straps 40 may be removably connected to the sheet 15 without the use of flaps 41, e.g., by use of various releasable connecting structures, including any releasable connecting structures described herein.

The embodiment in FIGS. 1-6 includes sheet portions 30 that each have pull straps 40 connected proximate both side edges 33 of the respective sheet portion 30. The pull straps 40 in this embodiment are connected to the sheet portions 30 at points that are spaced inwardly from the side edges 33, and are configured to extend laterally outwardly from the connection points, as similarly described above. As seen in FIGS. 1-6, each sheet portion 30 in this embodiment has two pull straps 40 connected proximate each side edge 33, with each pair of pull straps 40 being spaced along the side edge 33, so that one of the pull straps 40 of each pair is proximate the upper body of the patient 11 and the other is proximate the lower body of the patient 11. Additionally, in this embodiment, the connection points of the pull straps 40 are staggered longitudinally with respect to the pull straps 40 along the opposite side edge 33, as also described above. This structure produces a rotationally symmetrical configuration. The pull straps 40 are connected to each side edge 33 in a configuration such that when one of the side edges 33 of a sheet portion 30 is connected to one of the side edges 33 of another identical sheet portion 30, the resulting device 20 will have the pull straps 40 on the opposed side edges 23 staggered as described above. The pull straps 40 in the embodiment of FIGS. 1-6 are removably connected to the sheet portions 30 by use of flaps 41 connected to each sheet portion 30, as described above. The flaps 41 on each sheet portion 30 in this embodiment are positioned as described above, being connected to the bottom surface 32 at locations that are spaced laterally inwardly from the side edges 33 and spaced along the respective side edges 33. In this configuration, when the sheet portions 30 are connected to each other, each sheet portion 30 will have two flaps 41 that are positioned entirely beneath the device 20 proximate the center of the sheet 15. These flaps 41 positioned near the connection between the sheet portions 30 may not be connected to pull straps 40 for use in turning the patient 11, and only the flaps 41 proximate the side edges 23 of the sheet 15 may be connected to the pull straps 40 for use in turning, in one embodiment.

In one embodiment, as illustrated in FIGS. 1-6, the device 20 may also include one or more sheet handles 28 to facilitate pulling, lifting, and moving the device 20. In the embodiment illustrated in FIGS. 1-6, the device 20 has sheet handles 28 formed by strips 29 of a strong material that are connected (e.g., stitched) in periodic fashion to the top surface 21 at or around both side edges 23 of the device 20. The non-connected portions can be separated slightly from the device 20 to allow a user's hands to slip underneath, and thereby form the sheet handles 28. The sheet handles 28 formed by the strips 29 on the side edges 23 of the device 20 are useful for pulling the device 20 to move the patient 11 on the support device 12, particularly for moving the patient 11 laterally. The sheet handles 28 may be useful for moving the device 20 and the patient 11 in many different ways, including sliding the device 20 and the patient 11 and/or turning the patient 11. Additionally, the pull straps 40 on one side edge 23 may be threaded through sheet handles 28 on the opposite side edge 23 when in use for turning the patient 11. In the embodiment of FIGS. 1-6, each of the sheet portions 30 has strips 29 on the bottom surface 32, forming sheet handles 28 along both side edges 33. In other embodiments, the device 20 may include a different number or configuration of the sheet handles 28 as described above. For example, the sheet 15 and/or the sheet portions 30 may include sheet handles 28 connected to the bottom surfaces 22, 32, in addition to or instead of the sheet handles 28 connected to the top surfaces 21, 31. As another example, the sheet portions 30 may include sheet handles 28 along only a single side edge 23. The embodiment illustrated in FIGS. 11-16 has sheet handles 28 connected to the bottom surfaces 22, 32 at the side edges 33 of the device 20, with each sheet portion 30 having sheet handles 28 connected to one side edge 23 opposite the connector(s) 35, as described below. Further, the sheet 15 may additionally or alternately have sheet handles 28 connected along the end edges 34. Still further, the sheet handles 28 may be connected to the device 20 in a different way, such as by heat welding, sonic welding, adhesive, etc. The sheet handles 28 may be formed of a strong, relatively inelastic material, such as a nylon material. Other types of handles may be utilized in further embodiments.

FIGS. 11-16 illustrate another embodiment of a system 10 for use in turning and positioning a person resting on a surface, which includes a patient turning device 20. The embodiment of FIGS. 11-16 includes many features that are similar or identical to the features described above with respect to the embodiments in FIGS. 1-10, both in structure and in function, and such similar or identical structures and functions in the embodiment of FIGS. 11-16 will not otherwise be described in detail for the sake of brevity. Similar reference numbers are used with respect to the embodiment of FIGS. 11-16 to reference features similar to those in the embodiments of FIGS. 1-10.

The device 20 in the embodiment of FIGS. 11-16 includes two pairs of pull handles (e.g., pull straps 40), with each pair connected along one of the side edges 23 of the sheet 15, similar to the embodiments of FIGS. 1-10. The pull straps 40 in this embodiment are releasably connected to flaps 41 that are connected to the sheet 15 along the side edges 23, also similar to the embodiments of FIGS. 1-10. The device 20 in FIGS. 11-16 differs from the embodiments in FIGS. 1-10 in that the device of FIGS. 11-16 includes sheet portions 30 that can be connected to each other in only one orientation, with one sheet portion 30A being a dedicated "left" or "first" sheet portion and the other sheet portion 30B being a dedicated "right" or "second" sheet portion when viewed from above the top surface 21 of the sheet 15. It is understood that the use of "left" and "right" or "first" and "second" in this context is intended only for reference in understanding the drawings, and that no structure should be implied by the use of these terms. Indeed, it is recognized that rotation of the device 20 of FIGS. 11-16 by 180° in the plane of the sheet 15 would place the left sheet portion 30A on the right side of the right sheet portion 30B. The left sheet portion 30A in this embodiment is configured for connection of the pull straps 40 only along the left side edge 33, and the right sheet portion 30B in this embodiment is configured for connection of the pull straps 40 only along the right side edge 33. The sheet portions 30 in FIGS. 11-16 are each provided with flaps 41 in these locations for connection to the pull straps 40, as described herein.

The device 20 in the embodiment of FIGS. 11-16 has sheet handles 28 that are positioned differently from the sheet handles 28 of the embodiments of FIGS. 1-10. In this embodiment, the sheet 15 has strips 29 forming sheet handles 28 connected to the bottom surfaces 22, 32 at the side edges 33 of the sheet 15, with each sheet portion 30 having strips 29 forming sheet handles 28 connected to one side edge 23 opposite the connector(s) 35. The sheet portions 30 do not have the sheet handles 28 on both side edges 23 in this embodiment.

The sheet portions 30 in the embodiment of FIGS. 11-16 are connected by use of releasable connectors 35 in the form of hook-and-loop connecting structures or other complementary releasable connecting materials. In this embodiment, the left sheet portion 30A has a releasable connector 35 on the top surface 31 (see FIG. 13), and the right sheet portion 30B has a complementary connector 35 on the bottom surface 32 (see FIG. 16). These connectors 35 are positioned along the side edges 33 of the respective sheet portions 30 and slightly inwardly from the side edges 33, such that portions of each sheet portion 30 overlap each other when connected. The connectors 35 in this embodiment are provided as a single, continuous strip of the releasable connecting material that extends along the side edge 33, but may be provided as separate strips in another embodiment, such as shown in FIGS. 7-10. In further embodiments, the sheet portions 30 may use other releasable connectors 35 having different structures, including any releasable connecting structure or material described herein.

The pull straps 40 may be made from any suitable material, and may be made from a strong, flexible, but relatively inelastic material. In one embodiment, the pull straps 40 may be made from the same material as the strips 29 forming the sheet handles 28, such as a nylon material, as described above. The pull straps 40 are generally configured for connection to the sheet 15, and may have releasable connecting structures 43 for forming a releasable connection with the sheet 15, as described above. The pull straps 40 may also have one or more handles 46 configured for gripping by the user for pulling the straps. The pull straps 40 illustrated in FIGS. 1 and 11 each have a handle 46 at the end opposite the connecting structure 43 that is formed by a loop at the end of the pull strap 40, e.g., by stitching the end of the pull strap 40 in a loop. The pull straps 40 illustrated in FIG. 1 have additional handles 46 along the length of the strap 40 that are formed by separate pieces of the same material connected to the pull strap 40, e.g., by stitching. In other embodiments, the pull straps 40 may have a different number, type, and/or configuration of handles 40, including handles formed of other types of materials, such as rigid grips. In a further embodiment, the pull straps 40 may not have structurally distinct handles. It is understood that the number of pull straps 40 used in connection with the device 20 may depend on the configuration of the device 20 itself and the intended use of the device, e.g., how many pull straps 40 the device 20 is designed to include during use. It is also understood that while all of the pull straps 40 are illustrated as being identical, a combination of differently configured pull straps 40 may be used in another embodiment.

The device 20 may include one or more access apertures 37 (e.g., holes) through the sheet 15 to provide access to the patient 11 when the device 20 is wrapped around the patient 11, e.g., for medical equipment such as a catheter to pass through the device 20. The device 20 in the embodiment of FIGS. 11-16 has an access aperture 37 in each sheet portion 30, which is formed as a slit that is reinforced by a buttonhole stitch or other reinforcement. Any equipment that is inserted through the access aperture(s) 37 may be inserted before, after, or during use of the device 20 to roll a patient 11, as appropriate. The access aperture(s) 37 may be provided in a different size, shape, configuration, etc., in other embodiments. The embodiments in FIGS. 1-10 may also be provided with one or more access apertures 37 if desired. It is understood that if an access aperture 37 is provided in the embodiments of FIGS. 1-10, the sheet portions 30 may each have a more centrally-located access aperture 37 or two access apertures provided symmetrically, in order to retain the rotational symmetry described above.

Another embodiment of the system 10 and device 20 is illustrated in FIGS. 21-27. The embodiment of FIGS. 21-27 includes many features in common with the embodiments in FIGS. 1-10, which are similar in structure and/or in function, and such similar or identical structures and functions in the embodiment of FIGS. 21-27 will not otherwise be described in detail for the sake of brevity. In the embodiment shown in FIGS. 21-27, the flaps 41 are fixedly connected to the left and right sheet portions 30A-B (e.g., by stitching, adhesive, etc.) and are generally trapezoidal in shape (see FIGS. 24-26), with a wide base 44 connected to the sheet and decreasing in width farther from the base 44 and a short edge 49 opposite the wide base 44 that has a length that is shorter than the length of the base 44. In this embodiment, the pull handles are roll handles 47. A roll handle 47 is fixedly connected (e.g., by stitching) to each flap 41, and may be connected at or proximate the short edge 49. In the embodiment of FIGS. 21-27, the roll handle 47 is connected at two points proximate the ends of the short edge 49. The roll handle 47 may be formed of a strong, relatively inelastic material, such as a nylon material, and may have a length sufficient to extend away from the one corner of the short edge 49, loop back around on itself, and attach to the other corner of the short edge 49. An additional pull handle 48 is also fixedly connected (e.g., by stitching) to each flap 41, and may also be connected at or proximate the short edge 49 along a width of a top of the flap 41. The additional pull handle 48 may be formed by a strip of a strong material, such as a nylon material, and in the embodiment of FIGS. 21-27, the additional pull handle 48 is connected at each corner of the short edge 49. The non-connected portion of the additional pull handle 48 can be separated slightly from the short edge 49 to allow a user's hands to slip underneath, and thereby form the additional pull handle 48. The roll handle 47 and the additional pull handle 48 may be useful for moving the device 20 and the patient 11 in many different ways, including sliding the device 20 and the patient 11 and/or turning the patient 11.

Figure 21:
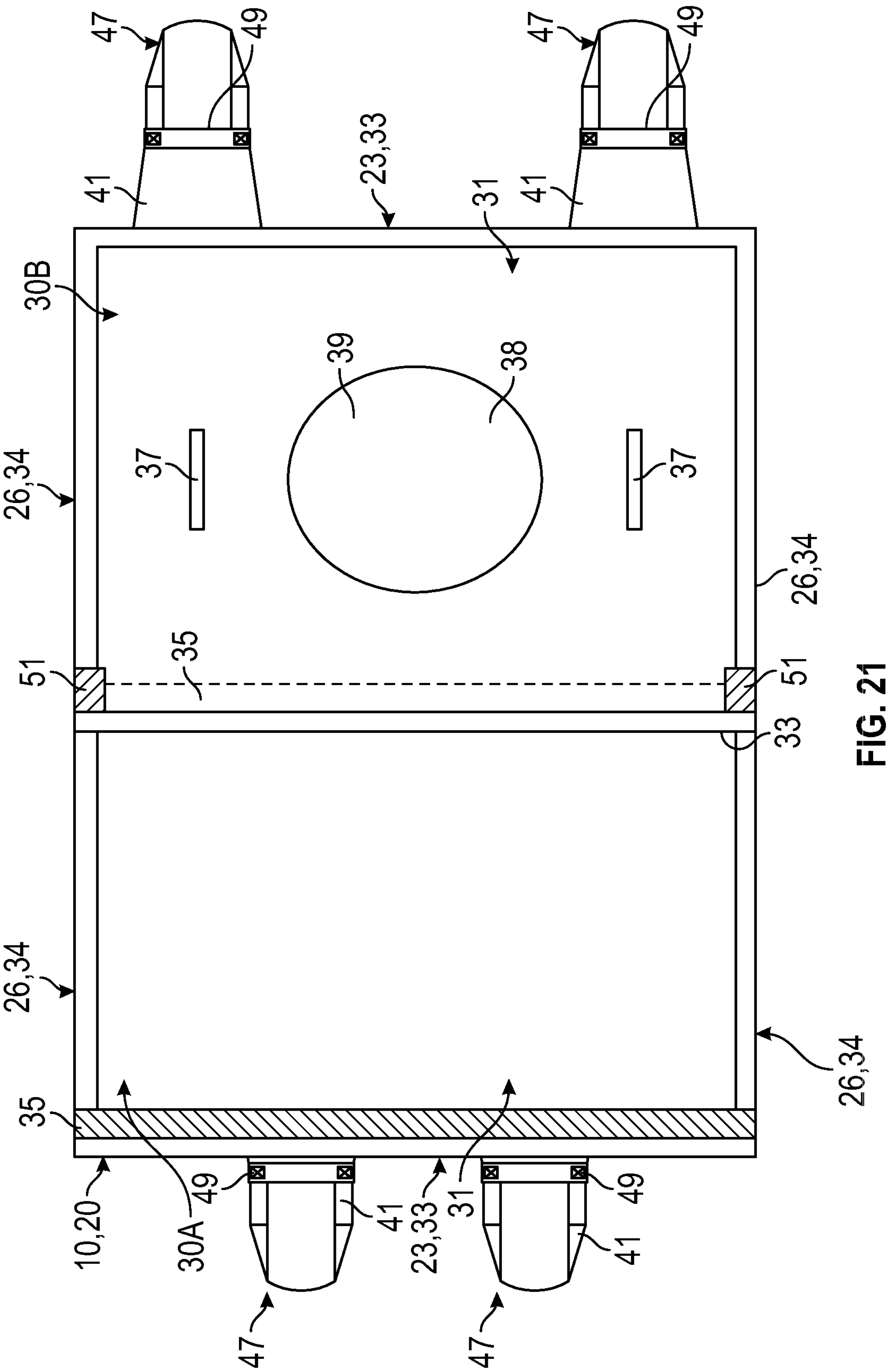
FIG. 21 is a top view of another embodiment of a patient turning device and system according to aspects of the present disclosure.

The flaps 41 on the right sheet portion 30B in the embodiment of FIGS. 21-27 are connected proximate the side edge 33 opposite the connector strip 35 and extend outward from this side edge 33. The flaps 41 on the left sheet portion 30A in this embodiment are located along the lateral centerline, i.e., equidistant from both side edges 33 of the left sheet portion 30A, as discussed in greater detail below. Furthermore, as shown in FIG. 21, the flaps 41 are offset longitudinally (i.e., in a direction extending between the end edges 34) with respect to the flaps on the opposite sheet portion, such that when the outer side edges 33 of each sheet 30A-30B are wrapped toward each other, the flaps 41 do not directly overlap each other. In the embodiment shown, the flaps on the left sheet portion 30A are longitudinally positioned toward the end edges 34, while the flaps 41 on the right sheet portion 30B are longitudinally positioned toward the longitudinal center, away from the end edges 34. In this way, when wrapped towards each other, flaps 41 on the left sheet portion 30A can pass between the flaps 41 on the right sheet portion 30B.

Figure 22:
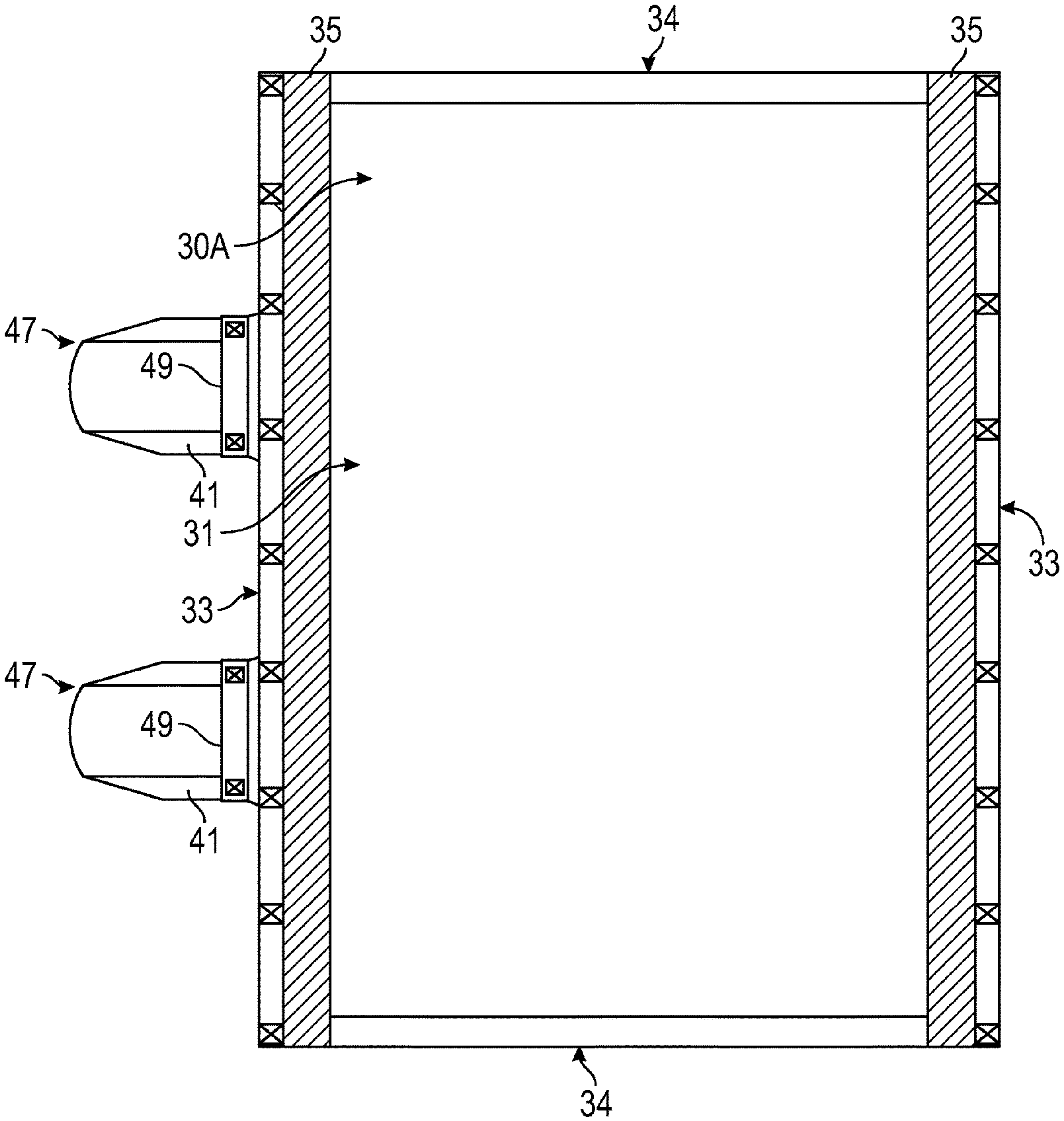
FIG. 22 is a top view of a left sheet portion of the device and system of FIG. 21.
Figure 23:
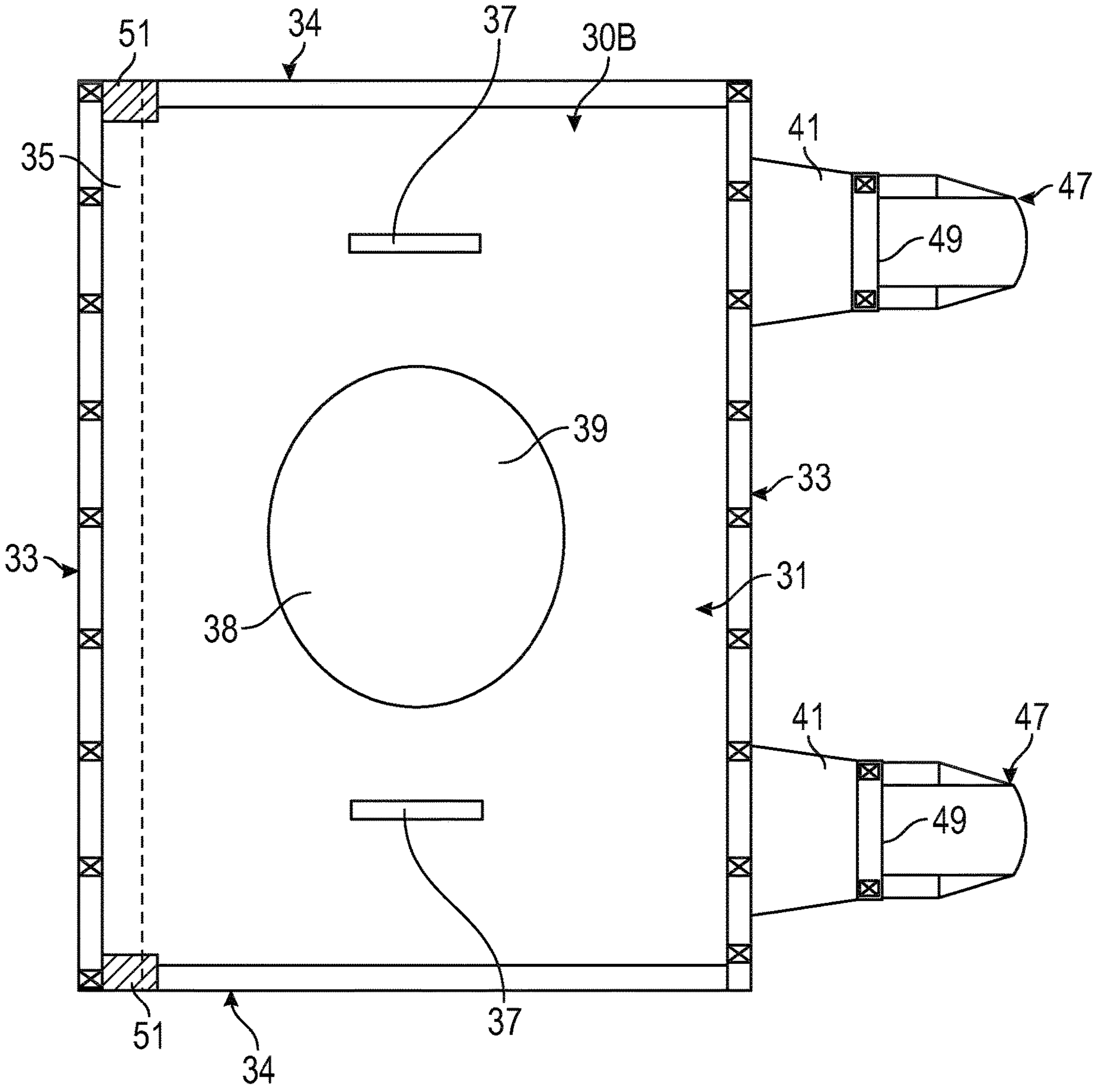
FIG. 23 is a top view of a right sheet portion of the device and system of FIG. 21.
Figure 24:
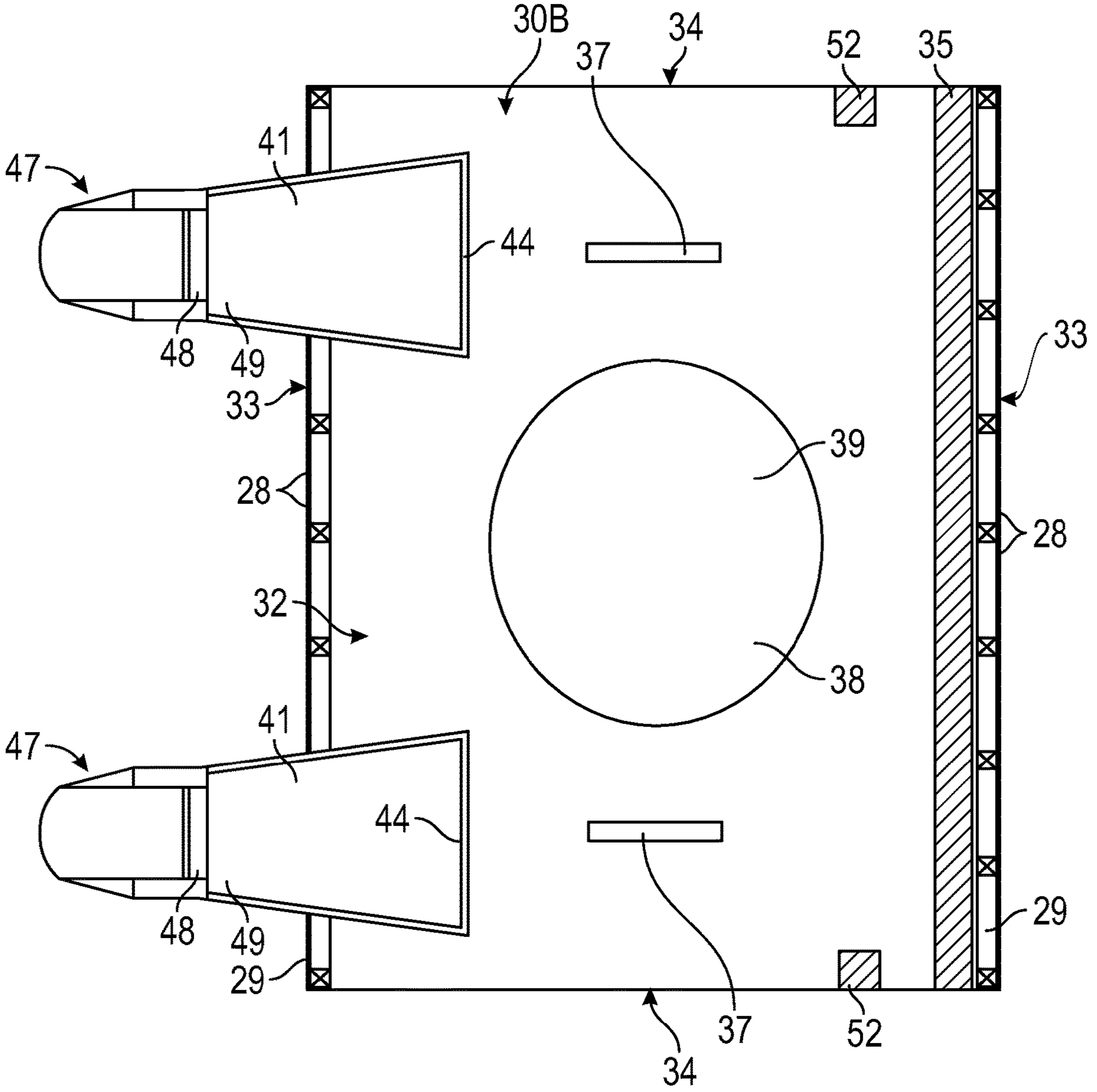
FIG. 24 is a bottom view of the right sheet portion of FIG. 23.
Figure 25:
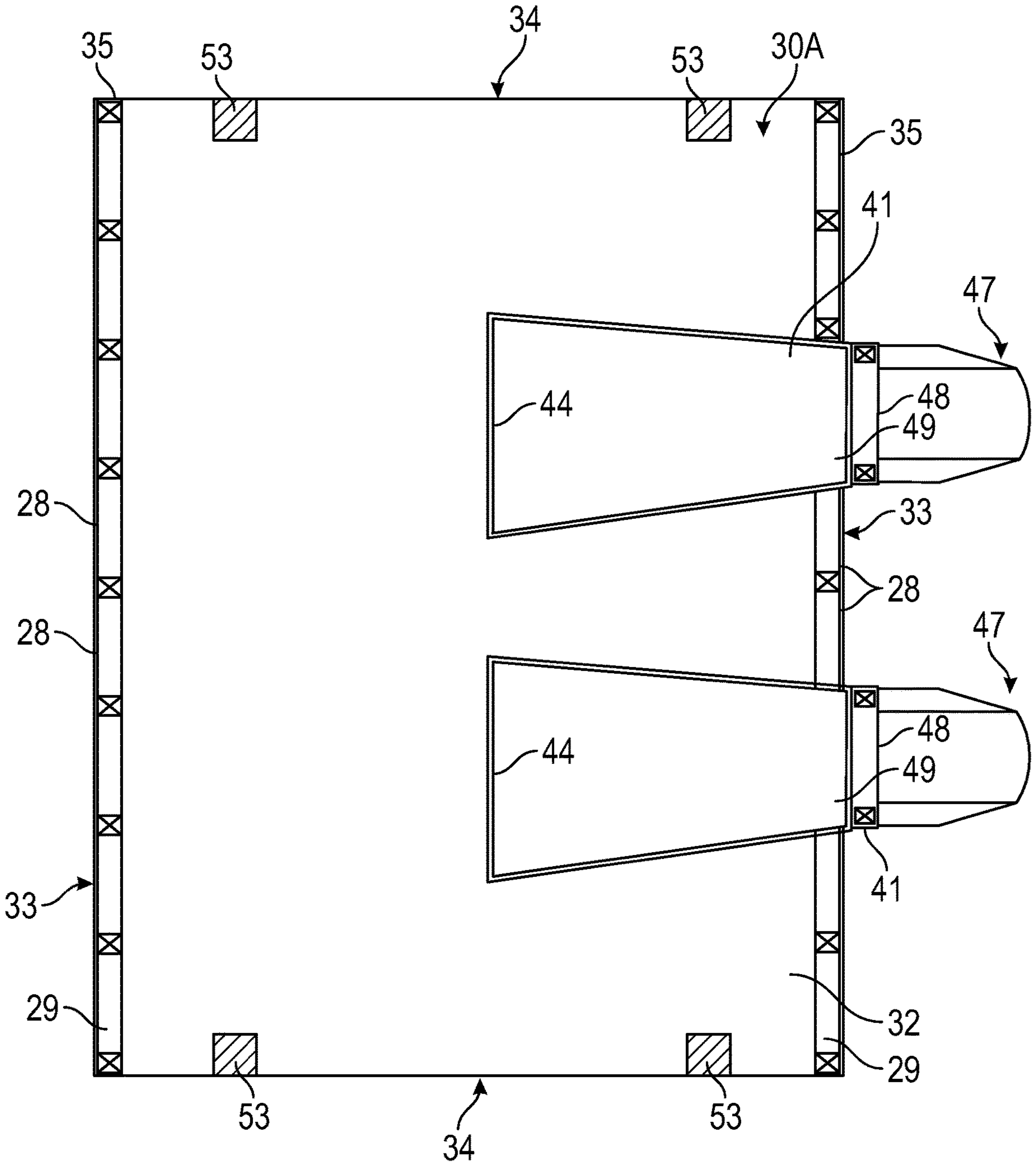
FIG. 25 is a bottom view of the left sheet portion of FIG. 22.

In the embodiment of FIGS. 21-27, the left sheet portion 30A is generally symmetrical with respect to a longitudinal axis and with respect to a lateral axis. Referring to FIG. 22, two releasable connector strips 35 are fixedly attached (e.g., by stitching) to the top surface 31 of the left sheet 30A at or near the side edges 33 in a symmetrical arrangement. The connector strips 35 in the embodiment of FIGS. 21-27 extend the entire lengths of the side edges 33 of the left sheet portion 30A, terminating at the end edges 34 of the left sheet 30A. The connector strips 35 in other embodiments may extend less than the entire lengths of the side edges 33 and/or may be formed in a number of spaced connector strips 35 along the side edges 33, with the connector strips 35 still positioned symmetrically with respect to each other. In the embodiment of FIGS. 21-27, the flaps 41 of the left sheet portion 30A are attached to the bottom surface 32 of the left sheet portion 30A in the center of the left sheet 30A, equidistant between the two side edges 33 of the left sheet portion 30A, as shown in FIG. 25. In this configuration, the flaps 41 can be folded to extend toward the left or right side edge 33 of the left sheet 30A. The flaps 41 are shown extending toward the left side edge 33 in FIGS. 21-22, 25 and 26, but it is understood that the flaps 41 may be "flipped" to extend to the right side edge to create a configuration that is a mirror-image of the configuration shown in FIGS. 22, 25, and 26. The symmetrical configuration of the left sheet 30A provides the benefit of allowing the left sheet to be attached to the right sheet 30B from either side. In this way, the left sheet 30A serves as a primary sheet and the right sheet 30B serves as a side sheet that can be placed on either side of the primary sheet. The right sheet 30B may be rotated to place its releasable connector strip 35 on either the left or right side of the patient 11, whereupon the nearest releasable connector strip 35 of the left sheet 30A is attached to the connector strip 35 of the right sheet 30B. It is understood that the flaps 41 may be extended to the side edge 33 of the left sheet 30A that is opposite the connection to the right sheet 30B when the sheets 30A-B are connected. It is also understood that the term "left sheet" is used with reference to the orientation shown in FIG. 21, and that the left sheet 30A would be located to the right of the right sheet 30B if the orientations of the sheets 30A-B are switched as described above.

In the embodiment of FIGS. 21-27, the left sheet portion 30A may include a body pad on the top surface 31. The body pad may protect the patient's skin by absorbing and locking in moisture while allowing air flow. The body pad may provide heat and moisture control to areas contacting the patient's skin. In some embodiments, the body pad is fixedly attached (e.g., by stitching, adhesive, etc.) to the top surface 31. In some embodiments, the body pad is removably attached to the top surface 31. For example, the body pad may include two releasable connector strips on a top and bottom of the body pad, such that the body pad can be releasably connected to the connector strips 35. The right sheet 30B could then by releasably connected to the body pad, and therefore the left sheet 30A via the connector strips on the body pad. In some embodiments, the body pad is removably attached using a different set of connectors such that the body pad does not interfere with the connector strips 35 of the left sheet portion 30A.

Figure 26:
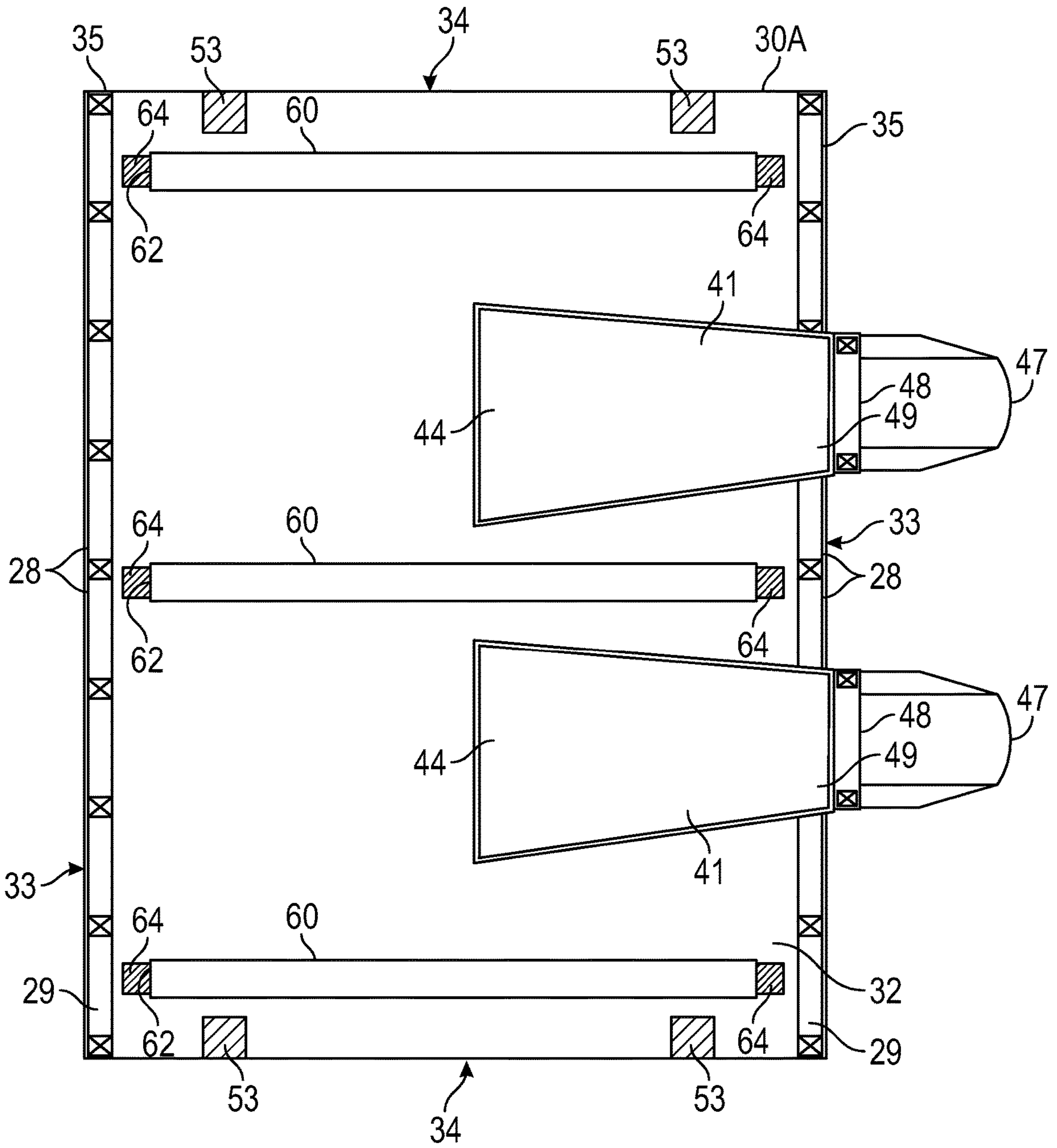
FIG. 26 is a bottom view of another embodiment of the left sheet portion of FIG. 22.

In one embodiment, the device 20 may include connecting structures or bundling mechanisms, such as one or more roll connections 51 and one or more attachment pads 52, 53 that are configured to assist in rolling or bundling loose portions of the device 20 during use. The device 20 in the embodiment of FIGS. 21-27 has two attachment pads 52 fixedly connected (e.g. by stitching, adhesive, etc.) to the bottom surface 32 of the right sheet 30B. The attachment pads 52 on the right sheet 30B as shown in FIG. 24 are located on each end edge 34 of the right sheet 30B, adjacent to or near the placement of the releasable connector 35. This embodiment also includes four attachment pads 53 fixedly connected (e.g. by stitching, adhesive, etc.) to the bottom surface 32 of the left sheet 30A. The attachment pads 52, 53 in this embodiment are formed by hook-and-loop connections or other complementary releasable connecting materials or structures to permit releasable connection. The attachment pads 53 on the left sheet 30A as shown in FIGS. 25 and 26 are located on each end edge 34 of the left sheet 30A, adjacent to or near the placement of the side edges 33. The device 20 in the embodiment of FIGS. 21-27 also includes two roll connections 51 fixedly connected (e.g. by stitching, adhesive, etc.) to the top surface 31 of the right sheet 30B. The roll connections 51 in this embodiment are formed by hook-and-loop connection or other complementary releasable connecting materials or structures to permit releasable connection, such that the roll connections 51 are capable of being releasably connected to any of the attachment pads 52, 53. The roll connections 51 as shown in FIG. 23 are located on each end edge 34 of the right sheet portion 30B, adjacent to or near the side edge 33 opposite the flaps 41. The attachment pads 52, 53 attached to the right sheet 30B and the left sheet 30A and the roll connections 51 connected to the right sheet 30B may be used in combination in rolling up the side sheets 30A, B to avoid tripping or tangling in the sheets, as more fully described herein.

Figure 27:
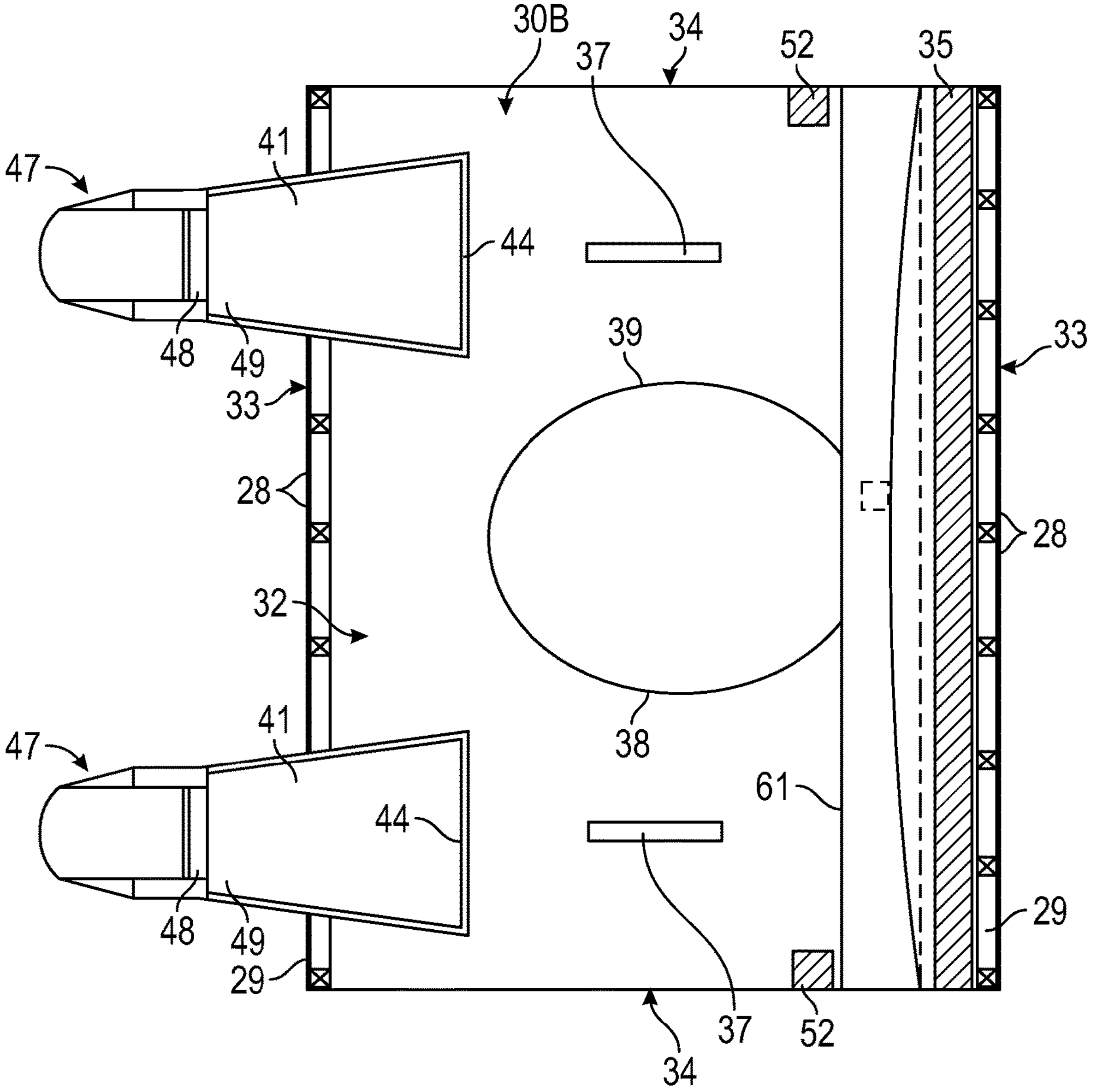
FIG. 27 is a bottom view of another embodiment of the right sheet portion of FIG. 23.

In some embodiments, the device 20 may additionally or alternatively have a bundling mechanism in the form of a drawstring mechanism to aid in bundling loose portions of the device. For example, the device 20 in the embodiment illustrated in FIG. 26 includes a compartment 60 on the bottom of the left sheet portion 30A. The compartment 60 includes two open ends 62 that a strap 64 is fed therethrough. The strap 64 may be formed of a strong, relatively inelastic material, such as a nylon material, and may have a length sufficient to extend the length of the compartment 60, with additional material extending out of both open ends 62. The straps 64 can be held while the left sheet portion 30A is moved to create a drawstring type configuration. The left sheet portion 30A may include a single compartment 60, or several compartments 60. Compartments 60 may be located near the edges 34, near the middle of the left sheet portion 30A, or both. In some embodiments, the compartments 60 are equally spaced along the length of the left sheet portion 30A. In some embodiments, there is provided a mechanism for securing the left sheet portion 30A in its bundled state after the sheet has been moved relative to the strap 64 to bundle loose portions. In yet another embodiment, as shown in FIG. 27, the device 20 may have a bundling mechanism in the form of a pocket 61 that is attached to the right sheet portion 30B and is configured to store the left sheet portion 30A when it is rolled or bundled, to contain the loose sheet. In some embodiments, the pocket 61 may be on the left sheet portion 30A for storing the right sheet portion 30B.

In one embodiment, the device 20 may have an expandable portion within the right sheet portion 30B that can expand to accommodate anatomical features of the patient 11. The expandable portion in the embodiment illustrated in FIGS. 21, 23, 24, and 27 includes an opening or hole 38 located in the central portion of the right sheet portion 30B, which may be cut or otherwise formed within the right sheet portion 30B. The shape of the opening 38 depicted in FIGS. 23-24 is circular, but the opening may be oval-, square-, or rectangle-shaped, or any other shape in other embodiments. For example, in FIG. 27, the opening 28 has an oval shape. A covering material 39 is positioned to cover the opening 38. In the embodiment shown in FIGS. 23-24 and 27, the covering material 39 is a flexible and elastic or stretchable material, e.g., polyurethane fabric ("Spandex") or a similar material to permit expansion of the expandable portion. The opening 38 may alternatively be covered by a less elastic covering material 39, such as a portion of the same material as the right sheet 30B, where the covering material 39 covering the opening 38 is sufficiently loose or billowy to allow the material to bulge away from the right sheet portion 30B when pressed to permit expansion of the expandable portion. The inclusion of the expandable portion in the right sheet 30B as described herein provides the benefit of accommodating the anatomy of the patient 11 when in the prone position. For example, where the patient 11 is a pregnant woman, the expandable portion allows for the patient's belly 11 to protrude through the aperture 38 and ensures the patient's comfort.

The device 20 in the embodiment in FIGS. 21-27 further includes two access apertures 37 on the right sheet 30B, with one access aperture 37 located on each longitudinal side of the opening 38, between the opening 38 and the end edges 34 of the right sheet 30B. In this embodiment, the right sheet 30B can be rotated and placed beneath the patient 11 with the connector strip 35 on either the patient's 11 right or left side, as described above.

Figure 17:
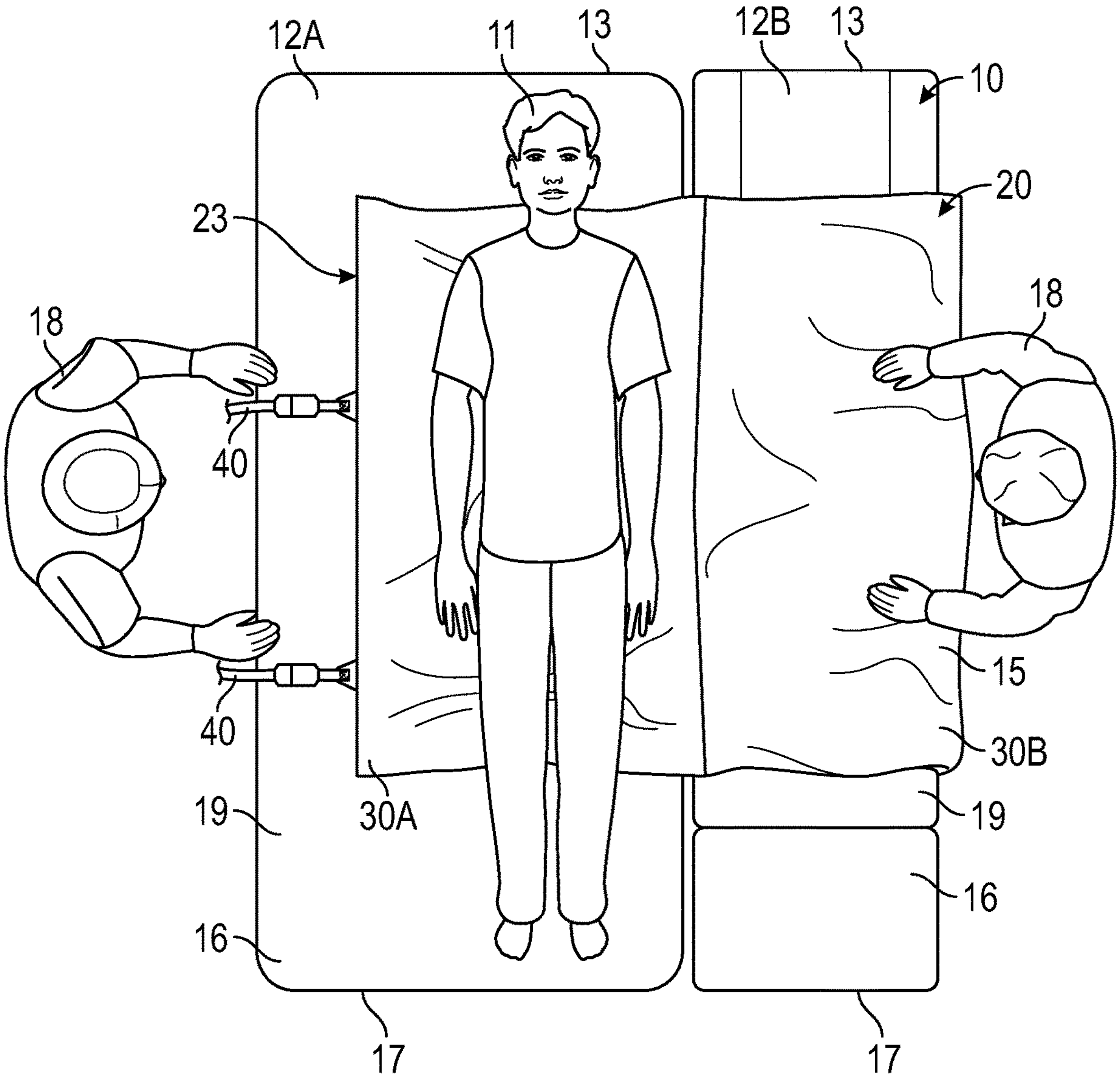
FIGS. 17-20 are top views illustrating a method of turning a patient according to aspects of the present disclosure, using the system of FIG. 11.

One embodiment of a method of using the system 10 to turn a patient 11 between a supine position and a prone position according to aspects of the disclosure is illustrated in FIGS. 17-20. The method is illustrated with respect to the embodiment of the system 10 shown in FIGS. 11-16, but it is understood that essentially the same method can be used in connection with the embodiments of FIGS. 1-10. The example in FIGS. 17-20 is illustrated for use in rolling a supine (e.g., a first position) patient to a prone position (e.g., a second position) and then back to supine, but it is understood that this method may be used for rolling between other positions, such as from a prone position to supine and back. In using the device 20, one of the sheet portions 30 (the left sheet portion in the illustrated example) is placed beneath the patient 11 on a supporting surface 16 of a support device in the form of a hospital bed or a gurney 12A, as shown in FIG. 17. The sheet portions 30 are illustrated in FIG. 17 as being connected already, but the patient 11 may be placed on the left sheet portion 30A alone, and the right sheet portion 30B may be connected at a later time, by using the connectors 35. The devices 20 in the embodiments in FIGS. 1-10 may be manipulated in the same or a similar manner. It is understood that in another embodiment, the right sheet portion 30B may be positioned under the patient 11, and the left sheet portion 30A may be connected on the left side thereof. If this method is used with either of the embodiments in FIGS. 1-10, such configurations enable another identical sheet portion 30 to be connected on either the right or left side of the sheet portion 30 positioned beneath the patient 11. The sheet portion 30 that is not positioned beneath the patient 11 may be referred to as the "free" sheet portion 30. The right sheet portion 30B in the illustrated configuration is initially the free sheet portion 30B, as illustrated in FIG. 17. In a configuration where the pull straps 40 are removable, such as shown in FIGS. 17-20, the pull straps 40 may be connected to the device 20 at any point during this step, either before or after placement of the sheet portion 30 beneath the patient 11 and either before or after connection of the two sheet portions 30 together. Additionally, the device 20 may be moved into a desired position before or after connection of the pull straps 40 or the free sheet portion 30B, such as by a caregiver 18 grasping the sheet handles 28. If the device 20 is used to roll the patient 11 onto another support device 12, then the patient 11 and the device 20 may be slid into position near the side 19 of the bed 12A. A second support device, such as an operating table 12B as shown in FIGS. 17-20, may be placed next to the bed 12A, if the patient 11 is to be rolled onto the second support device 12B.

Figure 18:
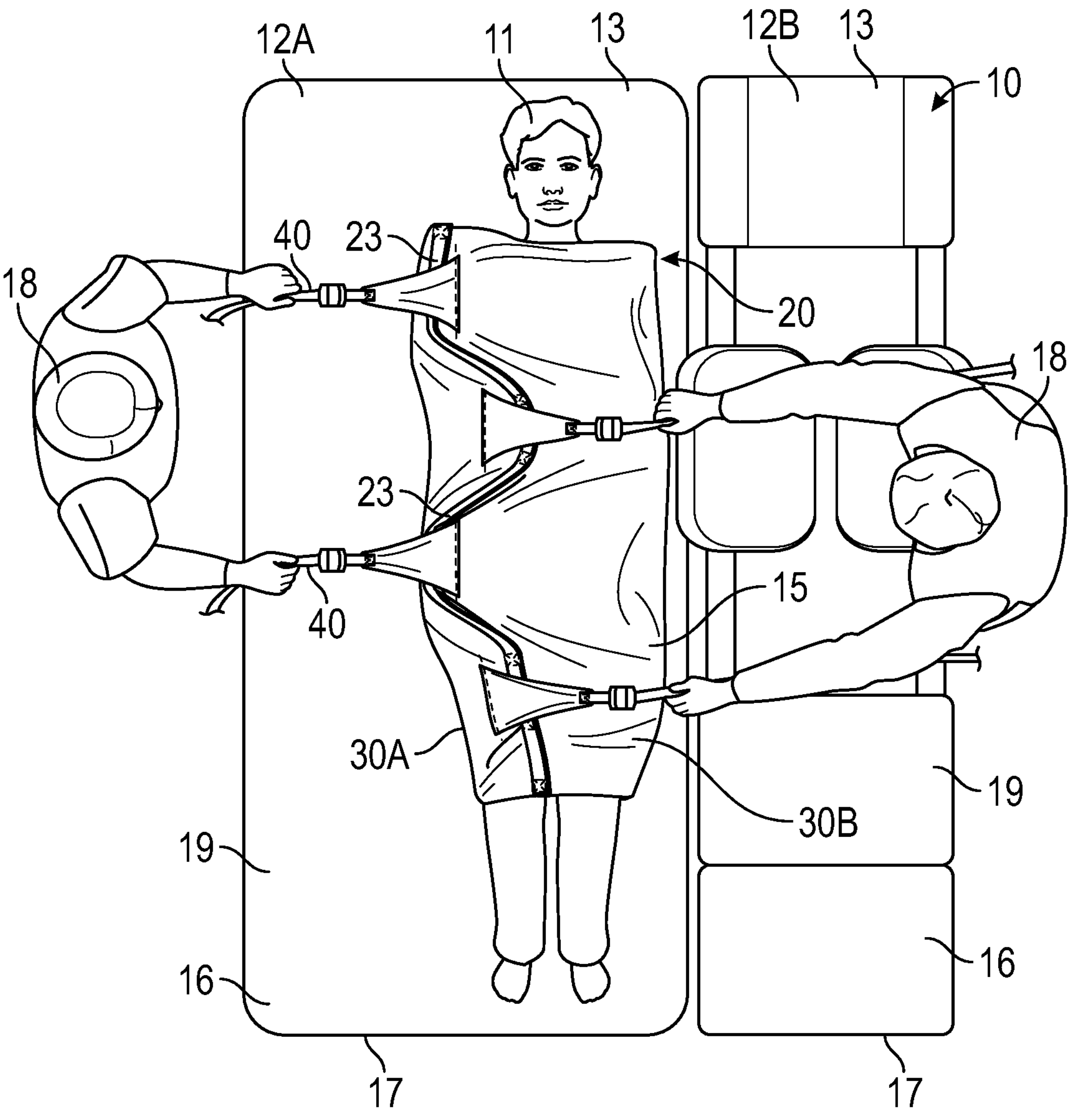
Figure 19:
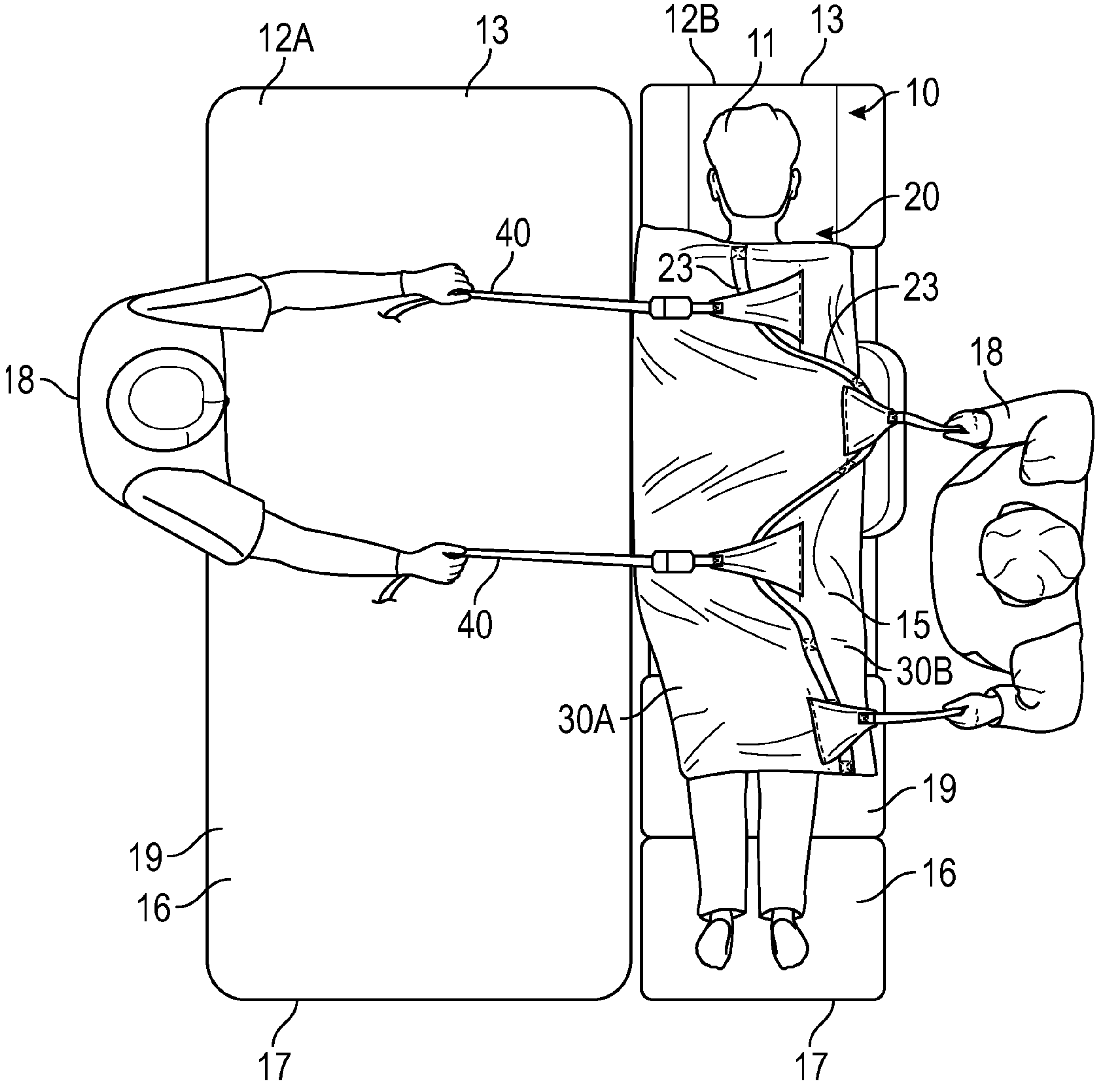
Figure 20:
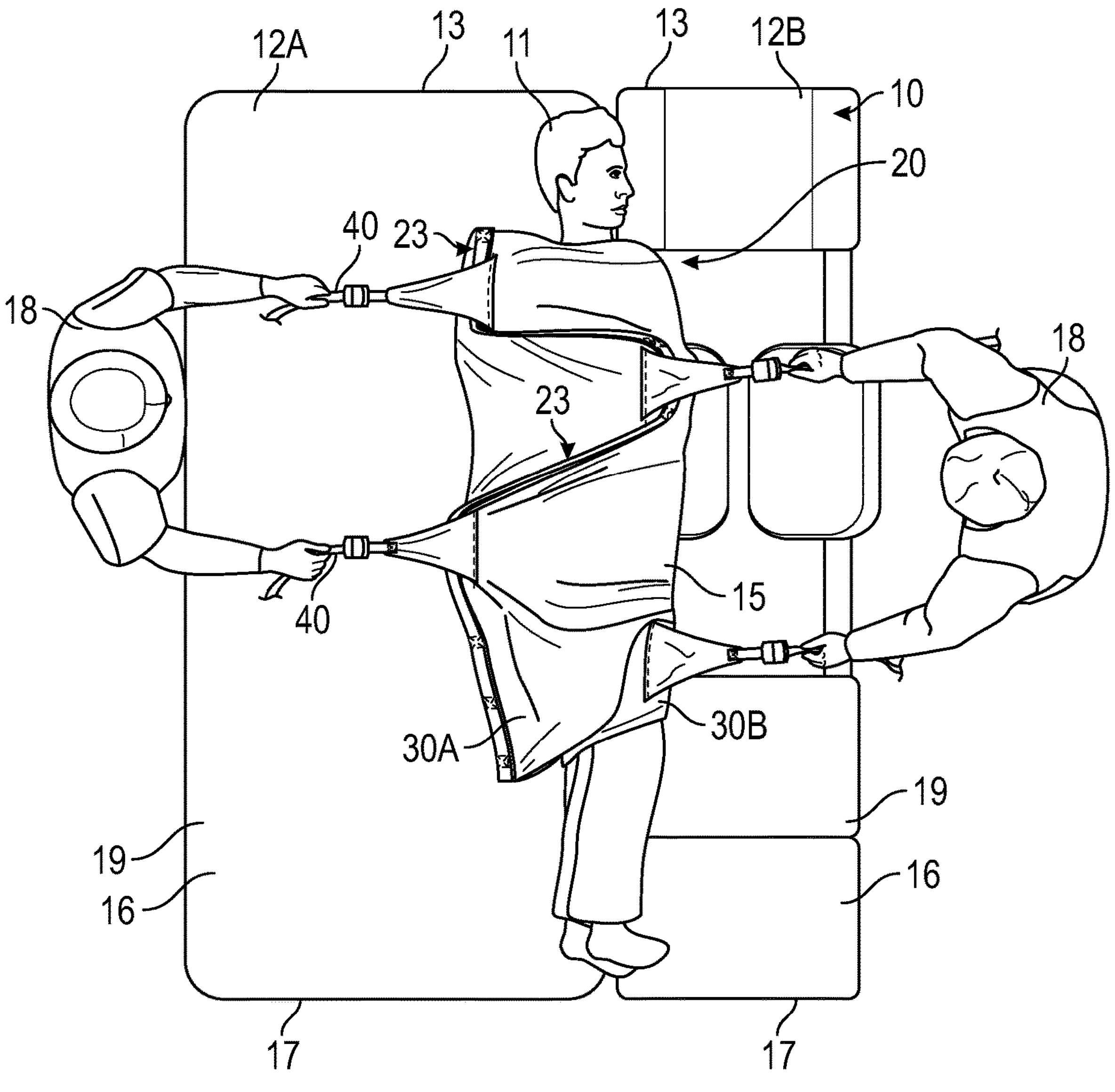

After the device 20 is in position beneath the patient 11, the free sheet portion 30B is wrapped over the top of the patient 11, and the pull straps 40 connected proximate the side edges 23 of the device 20 are wrapped in opposite directions across the patient 11, such that the caregiver 18 on the left side of the patient 11 can grasp the pull straps 40 connected at the right side edge 23 and the caregiver 18 on the right side of the patient 11 can grasp the pull straps 40 connected at the left side edge 23. This arrangement is illustrated in FIG. 18. In anticipation of rolling the patient 11 to the right in FIG. 18, the caregiver 18 on the left side pulls on the pull straps 40 until the free sheet portion 30B is wrapped tightly against the patient 11, and the caregiver 18 on the right side maintains a pulling force creating a tension and/or resistance force in the pull straps 40. At this point, the caregiver 18 on the right side can pull on the pull straps 40 to roll the patient 11 to the right, as shown in FIG. 19 by a pulling force in a direction opposite the direction of the resistance force. During this motion, the caregiver 18 on the left side maintains tension (e.g., a resistance force) in the pull straps 40 to prevent the patient 11 from rolling too quickly or violently. In the example illustrated, the patient 11 is rolled to the right, from a supine position on the hospital bed or gurney 12A to a prone position on an operating table 12B, such as for spinal surgery or other surgery on the patient's back. It is understood that the formerly free sheet portion (right sheet portion 30B) in FIGS. 17-18 is positioned beneath the patient 11 at the stage shown in FIG. 19, and the other sheet portion (left sheet portion 30A) may be considered to be free at this point. The free sheet portion 30A can then be unwrapped and/or disconnected at this point and re-connected at a later time, if desired. The patient 11 can subsequently be rolled back to the supine position and onto the hospital bed or gurney 12A by the reverse technique, i.e., the left caregiver 18 creating a pulling force on the pull straps 40 to roll the patient 11 back to the left, while the right caregiver 18 creates a pulling force in a direction opposite the pulling force, causing a resistance force, as illustrated in FIG. 20. It is understood that other steps and variations may be used in connection with this method, as appropriate for proper patient care.

The system 10 and device 20 illustrated in FIGS. 21-27 may be used in a substantially similar manner to the embodiments of the system 10 and device 20 of FIGS. 1-16, such as illustrated in FIGS. 17-20. The system 10 and device 20 in FIGS. 21-27 provide additional functional features that may be used in connection with another embodiment of the method of using the system 10. In the embodiment of FIGS. 21-27, when the patient 11 is placed on the left sheet portion 30A, the right sheet portion 30B is free and generally hanging from the side of the support device 12, similar to the arrangement illustrated in FIG. 17. The right sheet portion 30B may be rolled onto itself in this embodiment, beginning at the side edge 33 proximate the flaps 41, or gathered in a drawstring fashion. Once the right sheet 30B is fully rolled, such that the right sheet 30B is in a roll or bundle proximate the side edge 33 of the left sheet portion 30A (i.e., the right side edge 33 as shown in FIG. 21), the attachment pads 52 on the right sheet portion 30B may be releasably affixed to the roll connections 51 on the right sheet portion 30B. Alternatively, the excess sheet material may be gathered using the drawstring configuration of FIG. 26 or the pocket of FIG. 27. Thus, removing the previously-dangling right sheet portion 30B from the area around the support device 12 and helping reduce the risk of tripping, snags, or entanglement with individuals or devices surrounding the support device 12 or patient 11.

Similarly, when the patient 11 is situated on the right sheet portion 30B and the device 20 is unfolded, the left sheet portion 30A is free and generally hanging from the side of the support device 12. The left sheet portion 30A may be rolled onto itself in this arrangement, beginning at the side edge 33 opposite the connection strip 35, or gathered in a drawstring fashion. Once the left sheet portion 30A is fully rolled, such that the left sheet portion 30A is in a roll or bundle proximate the side edge 33 of the right sheet portion 30B (i.e., the left side edge 33 as shown in FIG. 21), the attachment pads 53 on the left sheet portion 30A may be releasably affixed to the roll connections 51 on the right sheet portion 30B. Alternatively, the excess sheet material may be gathered using the drawstring configuration of FIG. 26 or pocket of FIG. 27. Thus, removing the previously-dangling left sheet portion 30A from the area around the support device 12 and helping reduce the risk of tripping, snags, or entanglement with individuals or devices surrounding the support device 12 or patient 11.

The use of the system(s) 10 and method(s) described herein can have beneficial effects for patients that are turned and positioned using the same, as well as for nurses or other caregivers who turn and position such patients. For example, patients that are turned using the device will be turned in a smooth and stable manner, avoiding sudden forces and twisting of portions of the patient's body, which could be particularly damaging to patients who are unconscious and/or have spinal injuries. As another example, the use of the straps for turning the patient allows the caregivers to turn the patient smoothly by pulling backward from an upright position, rather than lifting and/or bending over the patient, which can cause physical stress to the caregiver, particularly when heavier patients are involved. As a further example, the releasable connection between the sheet portions in one embodiment provides flexibility for use in different situations and allows the free portions of the sheet to be removed when not in use, so as to not cause a hazard or interfere with medical procedures being performed. The removable straps provide a similar benefit, as they can be removed when not in use, so as to not cause a hazard or interfere with medical procedures being performed. As a still further example, the sheet handles 28 along the side edges 33 of the sheet portions 30, in conjunction with the low friction nature of the sheet material, can be used by the caregiver 18 to more easily move or position the patient 11 on the support device 12, both before and/or after the patient 11 is rolled, to ensure the patient is in the most appropriate and/or comfortable position on the support device 12. As yet another example, once the patient 11 has been rolled onto a second support device 12, such as an operating table 12B, the sheet portion 30 that is no longer underneath the patient 11 may be removed by detaching the releasable connectors 35, thus helping to prevent entanglement or tripping hazards for the caregiver 18 while attending to the patient 11. Still other benefits and advantages over existing technology are provided by the system 10 and methods described herein, and those skilled in the art will recognize such benefits and advantages.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," "top," "bottom," "left," "right," etc., as used herein, are intended for illustrative purposes only and do not limit the embodiments in any way. Additionally, the term "plurality," as used herein, indicates any number greater than one, either disjunctively or conjunctively, as necessary, up to an infinite number. Further, "providing" an article or apparatus, as used herein, refers broadly to making the article available or accessible for future actions to be performed on the article, and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention.

What is claimed is:

1. An apparatus comprising:
a sheet comprising:
a first portion, and
a second portion connected to the first portion along a connection edge, the connection edge extending along a first axis;
a first flap coupled to the first portion;
a second flap coupled to the second portion; and
a first bundling assembly comprising:
a first cover coupled to the first portion and extending along a second axis that is perpendicular to the first axis, the first cover comprising:
a first cover first open end, and
a first cover second open end; and
a first bundling strap comprising:
a first cover first strap portion extending from the first cover first open end,
a first cover second strap portion extending from the first cover second open end, and
a first cover third strap portion disposed within the first cover and movable relative to the first cover.

2. The apparatus of claim 1, wherein the first cover is coupled to the first portion between the first flap and the second flap.

3. The apparatus of claim 1, wherein:
the first portion has a first area; and
the second portion has a second area equal to the first area.

4. The apparatus of claim 1, wherein the sheet is rectangular.

5. The apparatus of claim 1, further comprising a second bundling assembly comprising:
a second cover coupled to the first portion and extending along a third axis that is perpendicular to the first axis, the second cover comprising:
a second cover first open end, and
a second cover second open end; and
a second bundling strap comprising:
a second cover first strap portion extending from the second cover first open end,
a second cover second strap portion extending from the second cover second open end, and
a second cover third strap portion disposed within the second cover and movable relative to the second cover.

6. The apparatus of claim 5, wherein:
the sheet further comprises a lateral edge;
the first cover is coupled to the first portion between the lateral edge and the first flap; and
the second cover is coupled to the first portion between the first flap and the second flap.

7. The apparatus of claim 5, wherein:
the sheet further comprises:
a first lateral edge, and
a second lateral edge opposite the first lateral edge;
the first cover is coupled to the first portion between the first lateral edge and the first flap; and
the second cover is coupled to the first portion between the second lateral edge and the second flap.

8. The apparatus of claim 5, further comprising a third bundling assembly comprising:
a third cover coupled to the first portion between the first flap and the second flap, the third cover extending along a fourth axis that is perpendicular to the first axis, the third cover comprising:
a third cover first open end, and
a third cover second open end; and
a third bundling strap comprising:
a third cover first strap portion extending from the third cover first open end,
a third cover second strap portion extending from the third cover second open end, and
a third cover third strap portion disposed within the third cover and movable relative to the third cover.

9. The apparatus of claim 8, wherein:
the second axis is separated from the fourth axis by a first distance; and
the third axis is separated from the fourth axis by a second distance, the second distance equal to the first distance.

10. The apparatus of claim 1, further comprising a bundling pocket coupled to the second portion, the bundling pocket and extending along a third axis that is parallel to the second axis, the bundling pocket configured to facilitate storage of the first portion.

11. The apparatus of claim 1, wherein:
the first flap is trapezoidal;
the second flap is trapezoidal;
the first flap comprises:
a first flap first base coupled to the first portion, the first flap first base having a first length, and
a first flap second base opposite the first flap first base, the first flap second base having a second length;
the first length is greater than the second length;
the second flap comprises:
a second flap first base coupled to the first portion, the second flap first base having a third length, and
a second flap second base opposite the second flap first base, the second flap second base having a fourth length; and
the third length is greater than the fourth length.

12. The apparatus of claim 11, further comprising:
a first roll handle comprising a first loop, the first roll handle coupled to the first flap second base; and
a second roll handle comprising a second loop, the second roll handle coupled to the second flap second base.

13. The apparatus of claim 12, further comprising:
a first pull handle comprising a first strap, the first pull handle coupled to the first flap second base and positioned adjacent the first roll handle; and
a second pull handle comprising a second strap, the second pull handle coupled to the second flap second base and positioned adjacent the second roll handle.

14. The apparatus of claim 1, wherein:
the first portion comprises:
a first side edge opposite the connection edge, the first side edge having a midpoint, and
a first lateral edge contiguous with the first side edge and the connection edge; and
the first flap is coupled to the first side edge between the first lateral edge and the midpoint.

15. The apparatus of claim 14, wherein the first portion comprises:
a second lateral edge contiguous with the first side edge and the connection edge; and
the second flap is coupled to the first side edge between the second lateral edge and the midpoint.

16. The apparatus of claim 1, further comprising:
a third flap coupled to the second portion; and a fourth flap coupled to the second portion;

wherein the second portion comprises:

a first lateral edge contiguous with the connection edge, a first side edge opposite the connection edge, and a second lateral edge contiguous with the first side edge and the connection edge; and wherein the third flap is positioned between the first lateral edge and a midpoint of the first side edge and the fourth flap is positioned between the second lateral edge and the midpoint of the first side edge.

17. The apparatus of claim 16, wherein the first flap and the first lateral edge are separated by a first distance, and the third flap and the second lateral edge are separated by a second distance, wherein the first distance is greater than the second distance.

18. The apparatus of claim 17, wherein:

the second portion comprises a second side edge opposite the connection edge; and the second portion comprises an opening, the second portion extending entirely around the opening, the opening disposed between the third flap and the fourth flap, and the opening being centered between the connection edge and the second side edge and providing a passage through the sheet.

19. The apparatus of claim 1, further comprising a second bundling assembly comprising:

a second cover coupled to the first portion and extending along a third axis that is perpendicular to the first axis, the second cover comprising:

a second cover first open end, and a second cover second open end; and a second bundling strap comprising:

a second cover first strap portion extending from the second cover first open end, a second cover second strap portion extending from the second cover second open end, and a second cover third strap portion disposed within the second cover and movable relative to the second cover;

wherein the first cover is coupled to the first portion between the first flap and the second flap.

20. The apparatus of claim 1, further comprising a second bundling assembly comprising:

a second cover coupled to the first portion and extending along a third axis that is perpendicular to the first axis, the second cover comprising:

a second cover first open end, and a second cover second open end; and a second bundling strap comprising:

a second cover first strap portion extending from the second cover first open end, a second cover second strap portion extending from the second cover second open end, and a second cover third strap portion disposed within the second cover and movable relative to the second cover;

wherein the first portion has a first area;

wherein the second portion has a second area equal to the first area; and wherein the sheet is rectangular.

* * * * *